United States Patent
Oshidari

(10) Patent No.: US 12,473,968 B2
(45) Date of Patent: Nov. 18, 2025

(54) MOTOR UNIT

(71) Applicant: JATCO Ltd, Fuji (JP)

(72) Inventor: Toshikazu Oshidari, Yokosuka (JP)

(73) Assignee: JATCO Ltd, Fuji (JP)

( * ) Notice: Subject to any disclaimer, the term of this patent is extended or adjusted under 35 U.S.C. 154(b) by 0 days.

(21) Appl. No.: 18/561,761

(22) PCT Filed: May 26, 2022

(86) PCT No.: PCT/JP2022/021516
§ 371 (c)(1),
(2) Date: Nov. 17, 2023

(87) PCT Pub. No.: WO2022/270216
PCT Pub. Date: Dec. 29, 2022

(65) Prior Publication Data
US 2024/0229920 A1    Jul. 11, 2024

(30) Foreign Application Priority Data

Jun. 24, 2021 (JP) .................................. 2021-105242

(51) Int. Cl.
*F16H 57/04* (2010.01)
*F16H 57/02* (2012.01)

(52) U.S. Cl.
CPC ......... *F16H 57/0417* (2013.01); *F16H 57/02* (2013.01); *F16H 57/0482* (2013.01); *F16H 2057/02034* (2013.01)

(58) Field of Classification Search
CPC .... H02K 7/116; H02K 5/203; F16H 57/0417; F16H 57/02; F16H 57/0482; F16H 2057/02034; B60K 11/02
See application file for complete search history.

(56) References Cited

U.S. PATENT DOCUMENTS

| | | | |
|---|---|---|---|
| 11,413,946 B2 | 8/2022 | Absenger et al. | |
| 12,352,350 B2 | 7/2025 | Li et al. | |
| 2004/0163409 A1* | 8/2004 | Nakajima | B60L 3/003 62/505 |
| 2017/0040872 A1* | 2/2017 | Nitsch | H02K 7/08 |
| 2018/0076687 A1 | 3/2018 | Pritchard et al. | |
| 2018/0156326 A1* | 6/2018 | Pritchard | F16H 57/0483 |
| 2020/0263689 A1* | 8/2020 | Zhao | F04B 17/03 |
| 2021/0394600 A1* | 12/2021 | Absenger | H02K 7/116 |

FOREIGN PATENT DOCUMENTS

| | | | | |
|---|---|---|---|---|
| CN | 104154221 A | | 11/2014 | |
| CN | 105240495 A | * | 1/2016 | ............ F16H 57/04 |
| CN | 111137308 A | * | 5/2020 | ............ F16H 57/04 |
| DE | 102004013578 A1 | * | 12/2004 | ............ B60K 6/365 |
| DE | 102008004143 A1 | * | 7/2008 | ............... B60L 1/02 |
| DE | 102011084030 A1 | * | 4/2013 | ......... F16H 57/0417 |
| DE | 10 2018 207 842 A1 | | 11/2019 | |
| DE | 102018220496 A1 | * | 5/2020 | ............. H02K 5/20 |
| JP | 2008-185078 A | | 8/2008 | |
| WO | WO-2020/069744 A1 | | 4/2020 | |
| WO | WO-2021/042465 A1 | | 3/2021 | |

\* cited by examiner

*Primary Examiner* — Tisha D Lewis
(74) *Attorney, Agent, or Firm* — Foley & Lardner LLP

(57) ABSTRACT

Provided is a unit including: a housing configured to accommodate a planetary gear mechanism, in which the housing includes a flow path through which a coolant flows, the planetary gear mechanism includes a ring gear fixed to the housing, and the flow path has a portion that overlaps the ring gear when viewed in a radial direction.

16 Claims, 15 Drawing Sheets

MOTOR UNIT

The present application claims a priority based on Japanese Patent Application No. 2021-105242 filed with the Japan Patent Office on Jun. 24, 2021, all the contents of which are hereby incorporated by reference.

TECHNICAL FIELD

The present invention relates to a unit.

BACKGROUND ART

Patent Document 1 discloses a unit including a rotating electrical machine and a reduction gear.

PRIOR ART DOCUMENT

Patent Document

Patent Document 1: JP 2008-185078 A

SUMMARY OF INVENTION

It is required to improve heat exchange efficiency in the unit.

A unit according to an aspect of the present invention is a unit including:
  a housing configured to accommodate a planetary gear mechanism, in which
  the housing includes a flow path through which a coolant flows,
  the planetary gear mechanism includes a ring gear fixed to the housing, and
  the flow path has a portion that overlaps the ring gear when viewed in a radial direction.

According to an embodiment of the present invention, the heat exchange efficiency can be improved.

DESCRIPTION OF EMBODIMENTS

Figure 1:
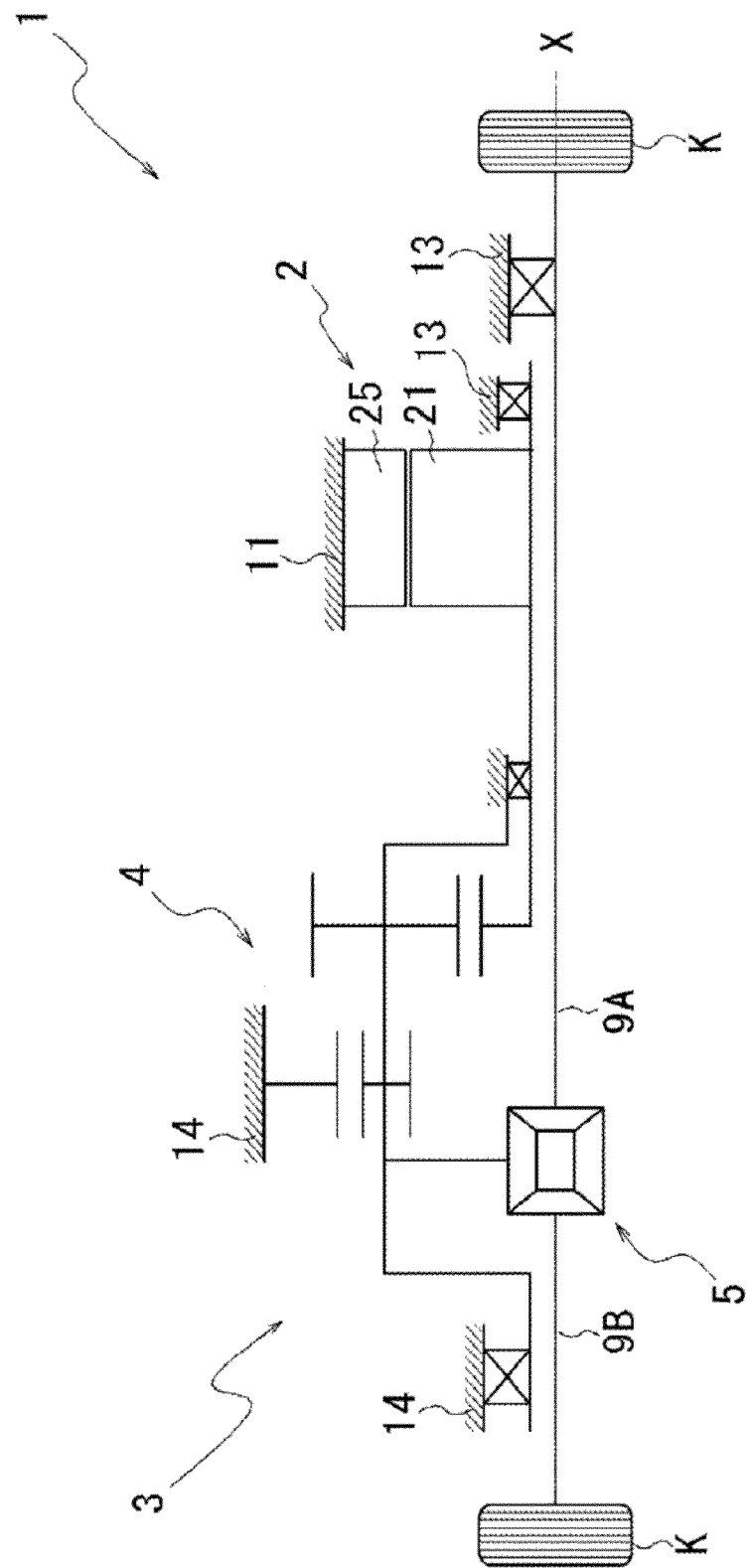
FIG. 1 is a skeleton diagram illustrating a unit.

First, definitions of terms in the present description will be described.

A "unit" is also referred to as a "motor unit", a "power transmission device", or the like. The motor unit is a unit that includes at least a motor. The power transmission device is a device that includes at least a power transmission mechanism, and the power transmission mechanism is, for example, a gear mechanism and/or a differential gear mechanism. A unit that is a device including a motor and a power transmission mechanism belongs to concepts of both the motor unit and the power transmission device.

A "housing" accommodates a motor, a gear, and an inverter. The housing includes one or more cases.

"3-in-1" means a form in which a part of a motor case accommodating a motor and a part of an inverter case accommodating an inverter are integrally formed. For example, when a cover and a case constitute one case, in "3-in-1", the case accommodating a motor and the case accommodating an inverter are integrally formed.

A "motor" is a rotating electrical machine that has a motor function and/or a generator function.

When referring to a second element (component, portion, or the like) connected to a first element (component, portion, or the like), the second element (component, portion, or the like) connected downstream of the first element (component, portion, or the like), and the second element (component, portion, or the like) connected upstream of the first element (component, portion, or the like), it means that the first element and the second element are connected such that power can be transmitted. A power input side is upstream, and a power output side is downstream. The first element and the second element may be connected to each other via another element (clutch, other gear mechanism, or the like).

The description "overlap when viewed in a predetermined direction" means that a plurality of elements are disposed in a predetermined direction, and has the same meaning as the description "overlap in a predetermined direction". The "predetermined direction" is, for example, an axial direction, a radial direction, a gravity direction, or a vehicle traveling direction (vehicle forward direction, vehicle backward direction).

When the drawing illustrates that a plurality of elements (components, portions, or the like) are disposed in a predetermined direction, in the description of the present description, it may be considered that there is a sentence explaining that the plurality of elements overlap when viewed in the predetermined direction.

The descriptions "do not overlap when viewed in a predetermined direction" and "offset when viewed in a predetermined direction" mean that a plurality of elements are not disposed in a predetermined direction, and have the same meaning as the descriptions "do not overlap in a predetermined direction" and "offset in a predetermined direction". The "predetermined direction" is, for example, an axial direction, a radial direction, a gravity direction, or a vehicle traveling direction (vehicle forward direction, vehicle backward direction).

When the drawing illustrates that a plurality of elements (components, portions, or the like) are not disposed in a predetermined direction, in the description of the present description, it may be considered that there is a sentence explaining that the plurality of elements do not overlap when viewed in the predetermined direction.

The description "a first element (component, portion, or the like) is positioned between a second element (component, portion, or the like) and a third element (component, portion, or the like) when viewed in a predetermined direction" means that when viewed from the predetermined direction, it can be observed that the first element is between the second element and the third element. The "predetermined direction" is an axial direction, a radial direction, a gravity direction, a vehicle traveling direction (vehicle forward direction, vehicle backward direction), or the like.

For example, when the second element, the first element, and the third element are disposed in this order along the axial direction, it can be said that the first element is positioned between the second element and the third element when viewed in the radial direction. When the drawing illustrates that the first element is positioned between the second element and the third element when viewed in a predetermined direction, in the description of the present description, it may be considered that there is a sentence explaining that the first element is between the second element and the third element when viewed in the predetermined direction.

In a case in which two elements (components, portions, or the like) overlap when viewed in the axial direction, the two elements are coaxial.

The "axial direction" means an axial direction of a rotation axis of a component that constitutes a unit. The "radial direction" means a direction orthogonal to the rotation axis of the component that constitutes a unit. The component is, for example, a motor, a gear mechanism, or a differential gear mechanism.

When a rotating element (for example, sun gear, carrier, or ring gear) of a planetary gear mechanism is "fixed" to another element, the rotating element may be directly fixed or may be fixed via another member.

A "downstream side in a rotation direction" means a downstream side in a rotation direction when a vehicle moves forward or in a rotation direction when the vehicle moves backward. It is preferable to regard it as the downstream side in the rotation direction when the vehicle moves forward, which occurs frequently. A downstream side in a rotation direction of the planetary gear mechanism means a downstream side in a revolution direction of a pinion gear.

A "catch tank" is an element (component, portion, or the like) that has a function of a tank (container) into which oil is introduced. The supply of oil from the outside of the tank to the tank is expressed as "catch". The catch tank is provided, for example, using at least a part of the housing, or is provided separately from the housing. Integrally forming the catch tank and the housing contributes to a reduction in the number of components.

The "coolant" is a refrigerant, and is, for example, a liquid (cooling water or the like) or a gas (air or the like). The coolant is a concept that includes oil, but when both the oil and the coolant are described in the present description, it means that the coolant is made of a material different from that of the oil.

A "heat exchange unit" is an element (component, portion, or the like) that exchanges heat between two different heat exchange media. Combinations of the two heat exchange media are, for example, oil and cooling water, cooling water and air, or air and oil.

In an embodiment of the present invention, it is preferable to use, for example, a flow path, through which the coolant flows, formed in the housing as the heat exchange unit. This is because the flow path can contribute to a reduction in dimension of the unit.

The "flow path, through which the coolant flows, formed in the housing" is a portion integrally formed with the housing. For example, heat exchange between the coolant and the oil and/or air in the housing is performed via a wall portion of the housing.

A "vehicle room" means a room in a vehicle into which occupants enter.

Hereinafter, the present embodiment will be described.

FIG. 1 is a skeleton diagram illustrating a unit 1.

Figure 2:
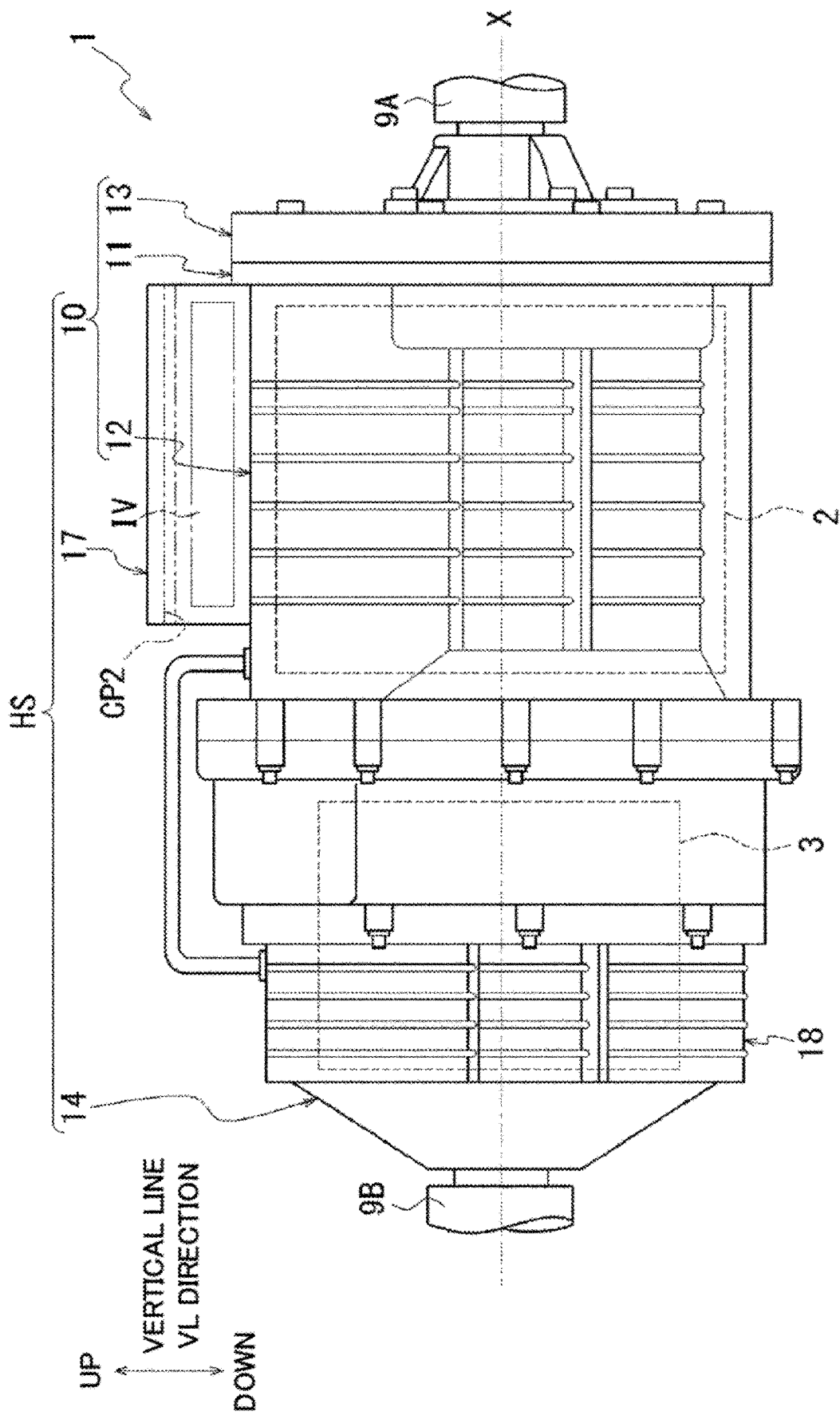
FIG. 2 is an external view of the unit.

FIG. 2 is an external view of the unit 1.

Figure 3:
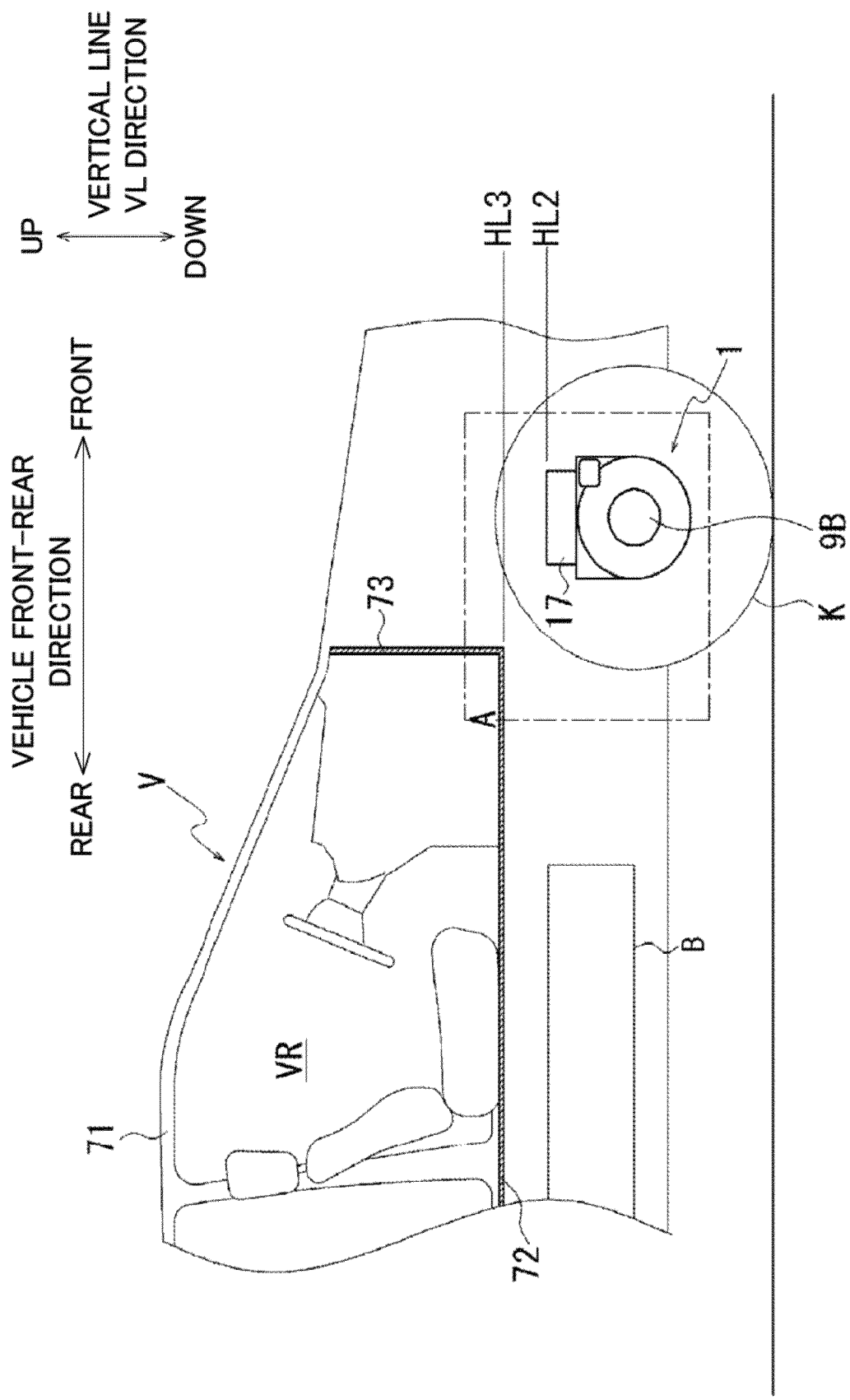
FIG. 3 is a diagram illustrating disposition of the unit in a vehicle.

FIG. 3 is a diagram illustrating disposition of the unit 1 in a vehicle V.

FIG. 3 is a view of the vehicle V when viewed from a right side.

Figure 4:
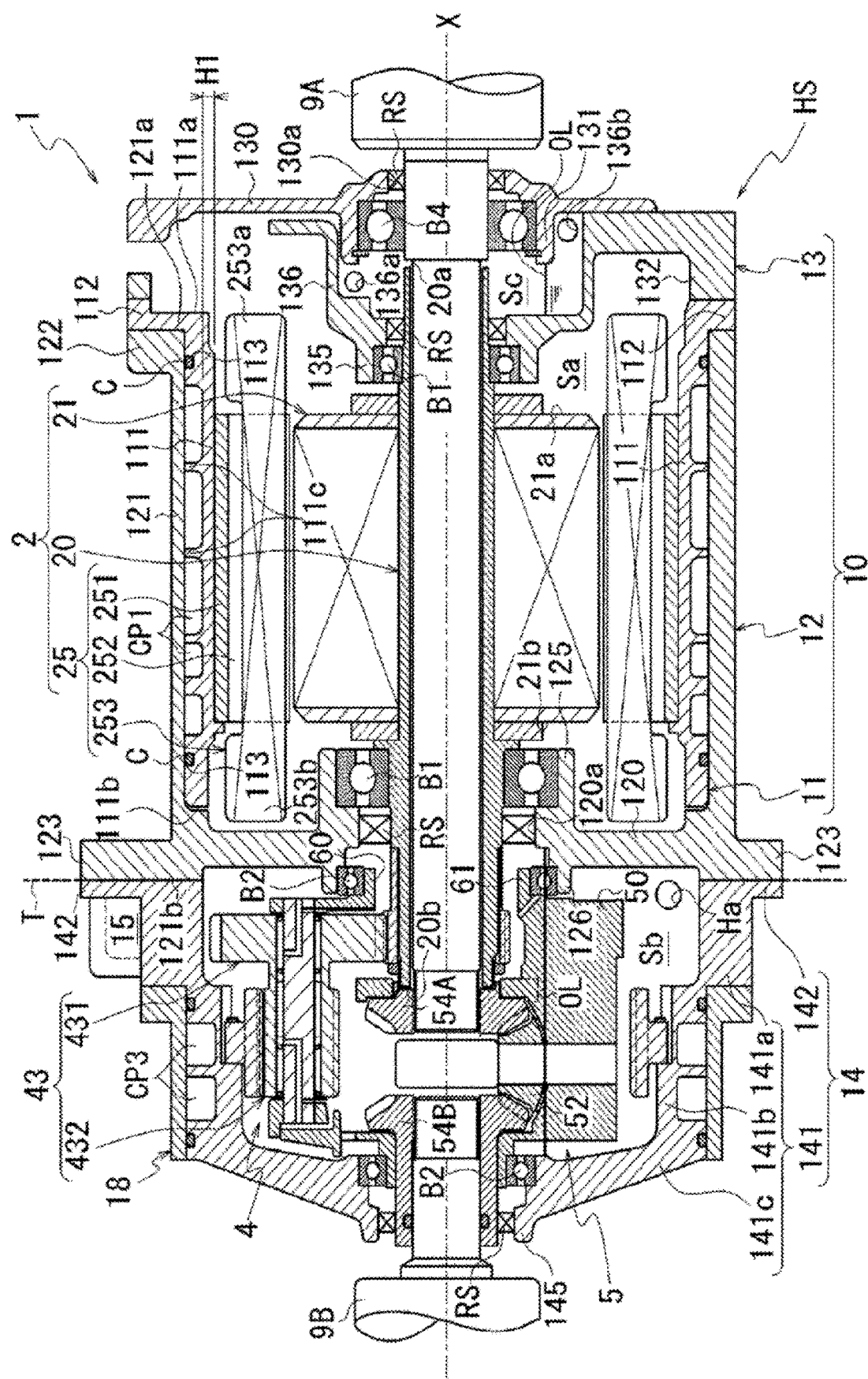
FIG. 4 is a schematic cross-sectional view of the unit.

FIG. 4 is a schematic cross-sectional view of the unit 1. FIG. 4 illustrates a state in which an inverter case is removed.

Figure 5:
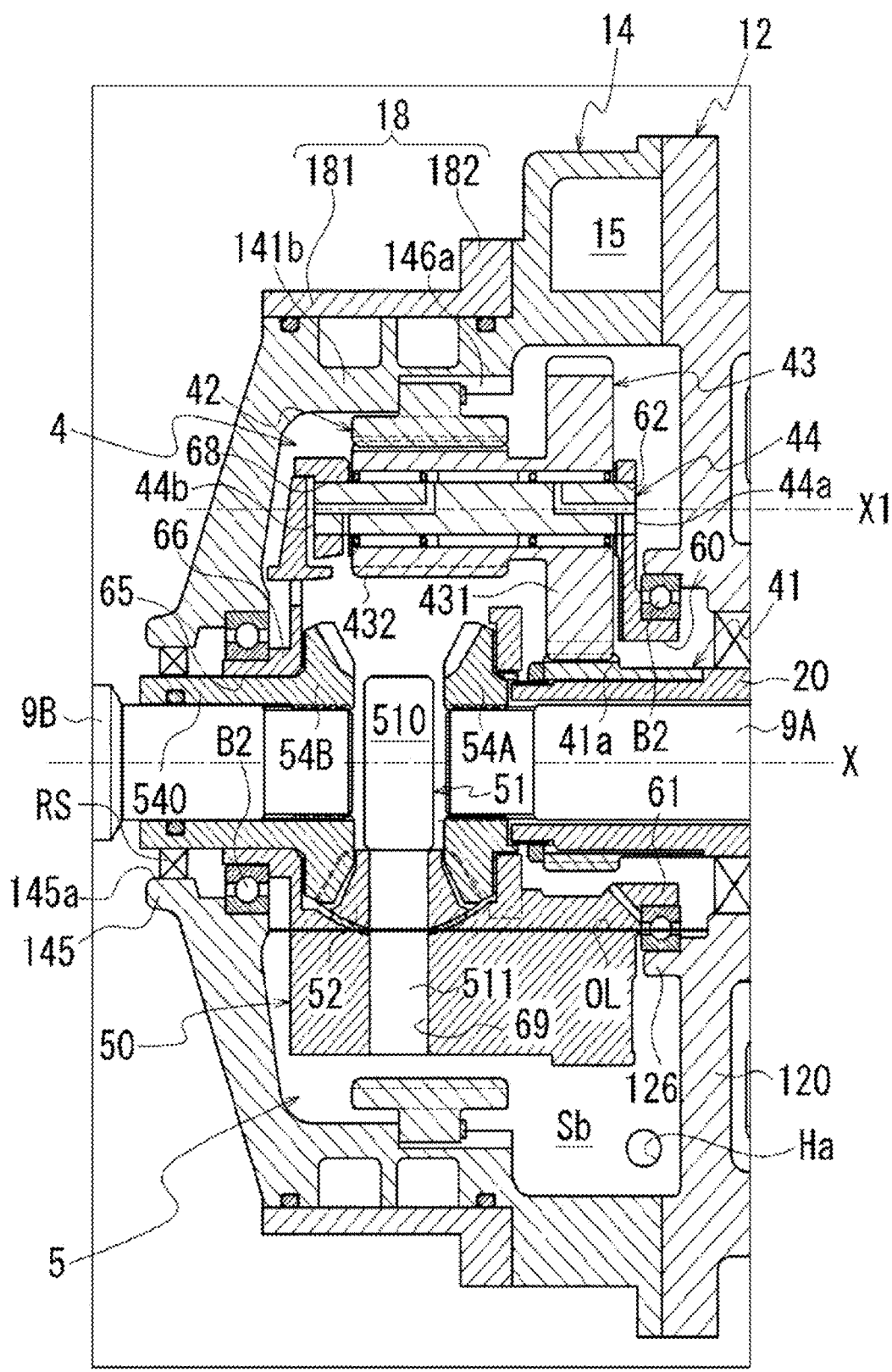
FIG. 5 is an enlarged diagram around a differential case.

FIG. 5 is an enlarged diagram around a differential case 50.

Figure 6:
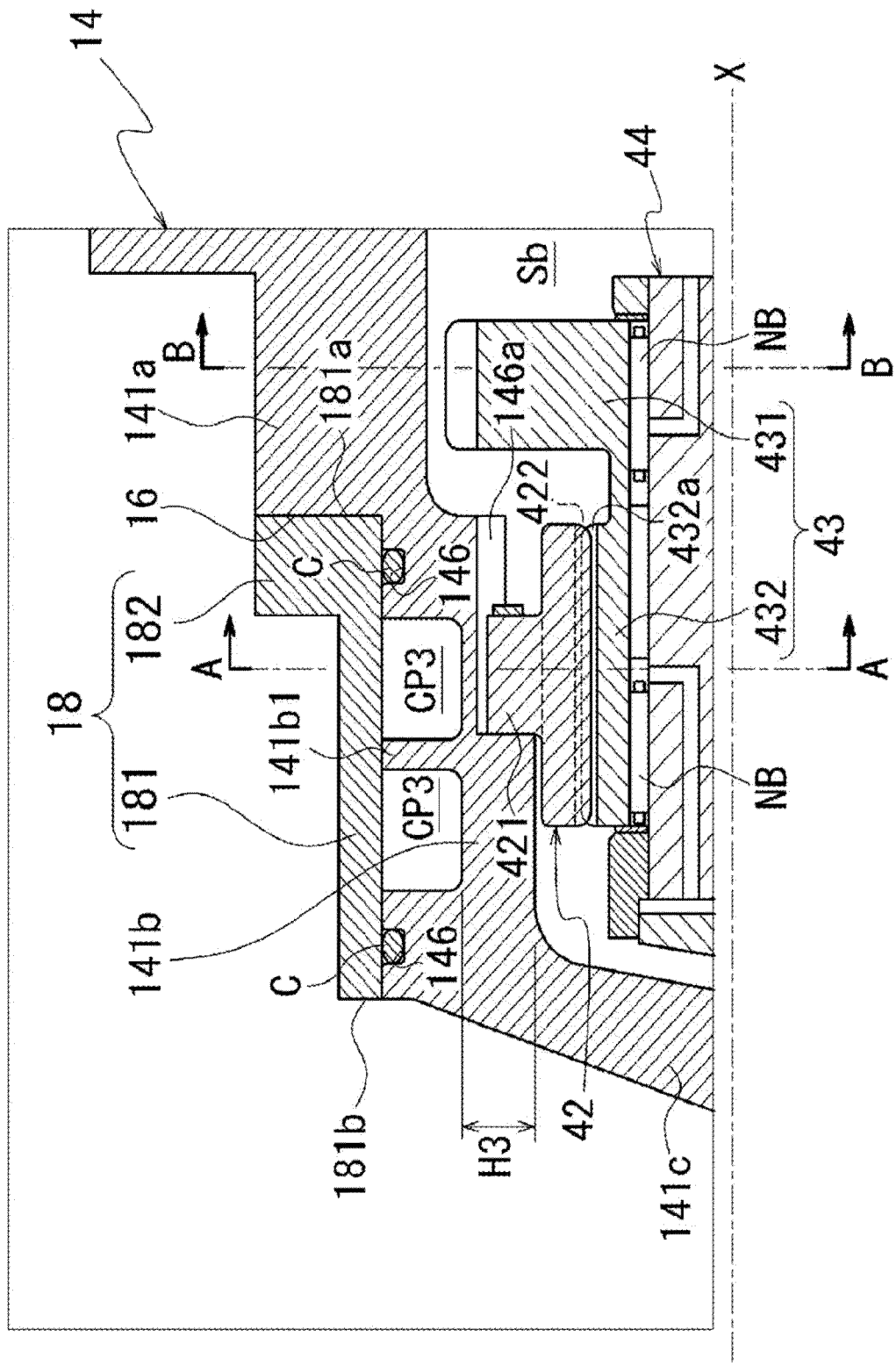
FIG. 6 is an enlarged diagram around a ring gear.

FIG. 6 is an enlarged diagram around a ring gear 42.

Figure 7:
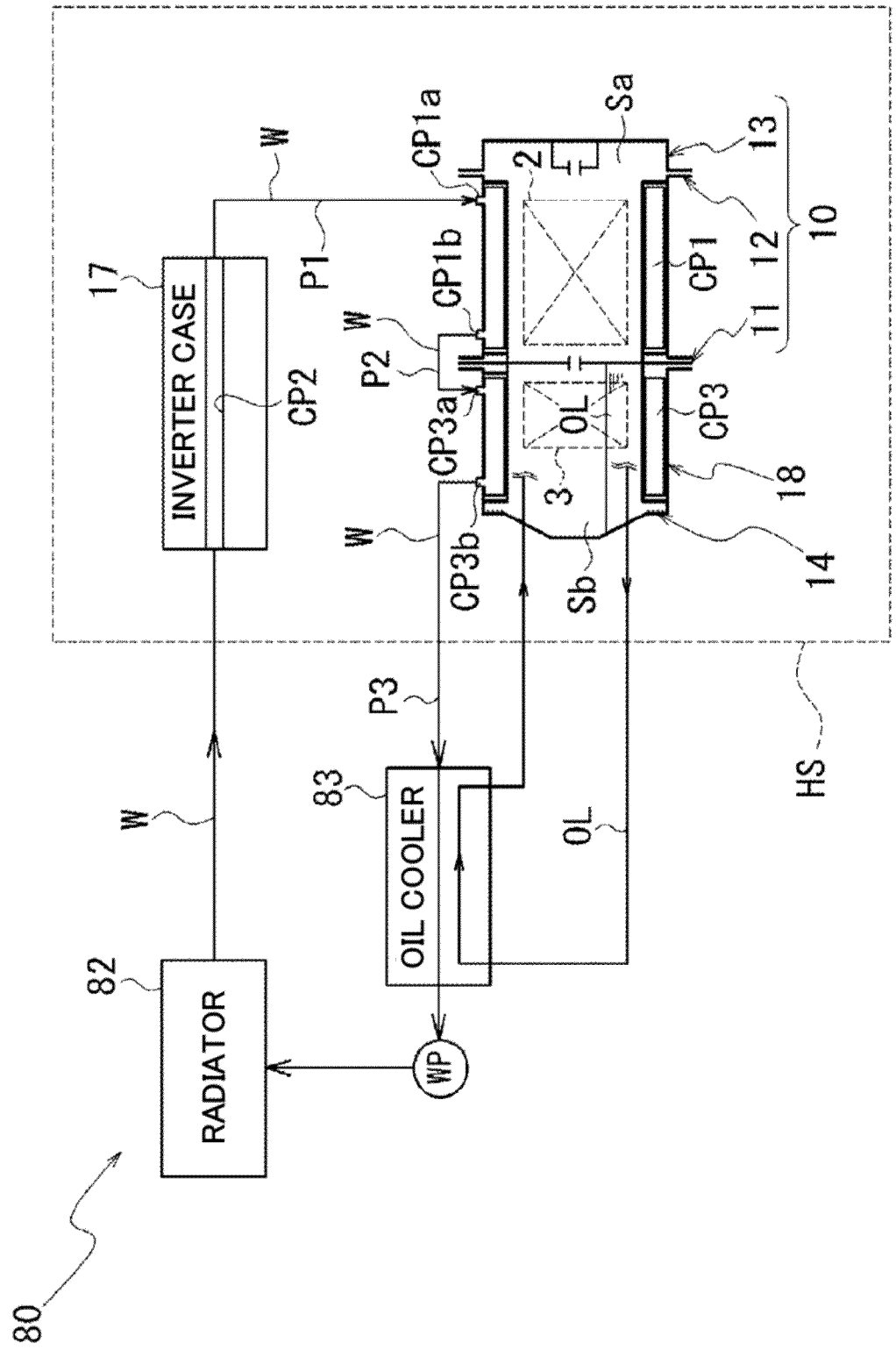
FIG. 7 is a diagram illustrating a circulation system of cooling water in the unit.

FIG. 7 is a diagram illustrating a circulation system 80 for cooling water W in the unit 1.

Figure 8:
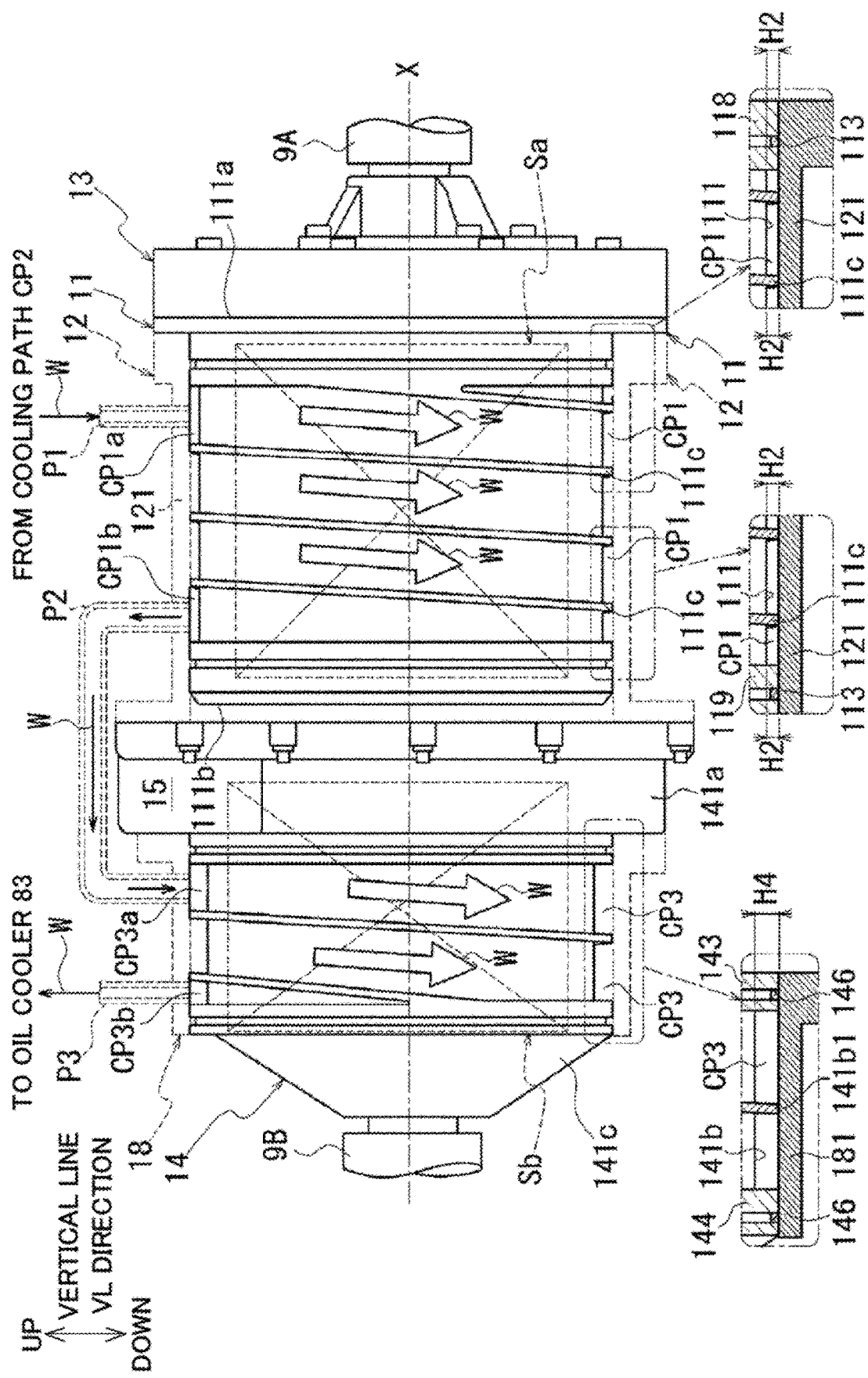
FIG. 8 is a diagram illustrating a cooling path.

FIG. 8 is a diagram illustrating cooling paths CP1 and CP3. FIG. 8 illustrates the unit when viewed from the same direction as FIG. 2. In FIG. 8, a second case member 12 and a cover member 18 are indicated by broken lines, and the inverter case is omitted. In enlarged diagrams in FIG. 8, regions of protrusions 111c and 141b1, thick portions 118 and 119, and thick portions 143 and 144 are illustrated with hatching.

Figure 9:
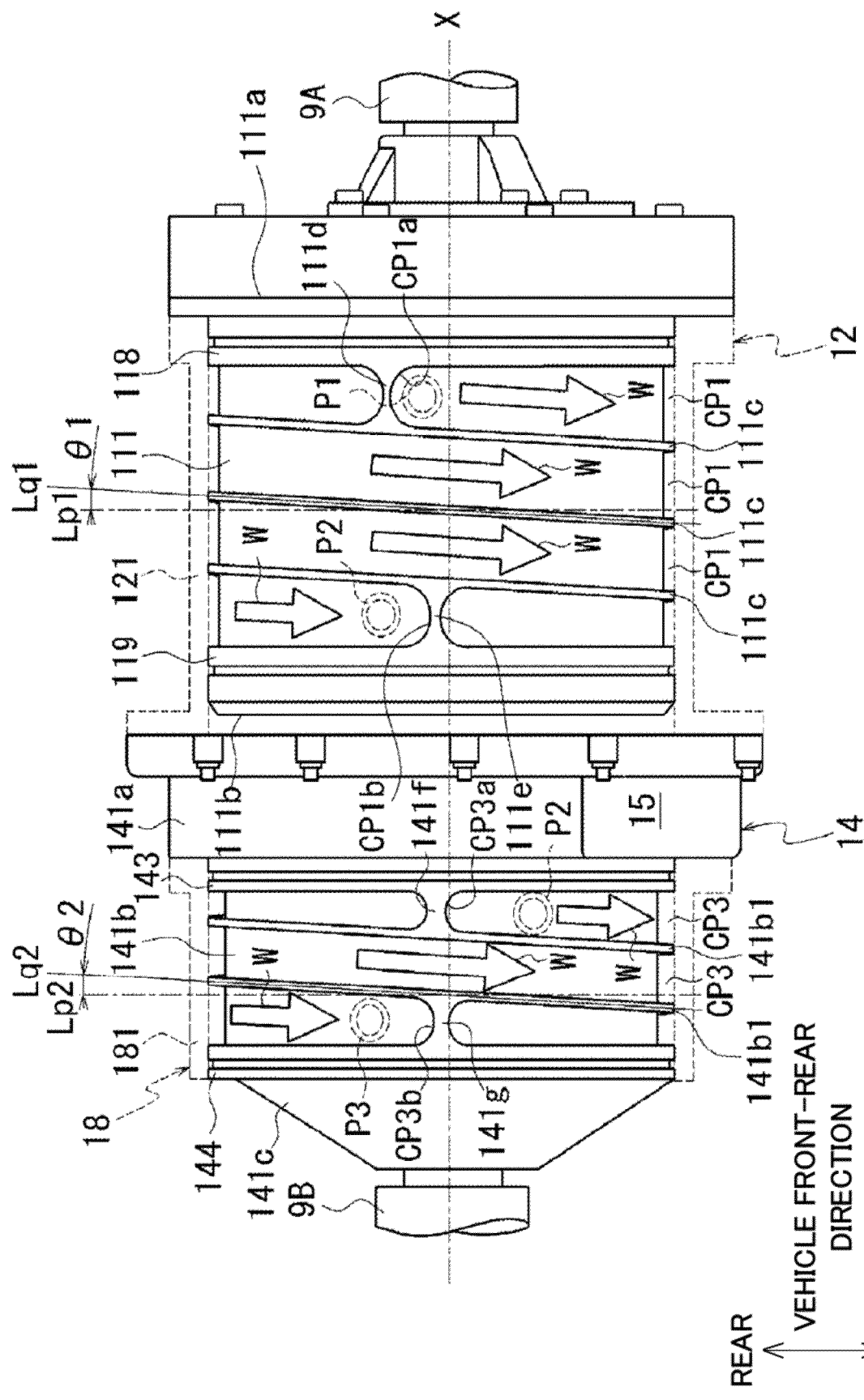
FIG. 9 is a diagram illustrating the cooling path.

FIG. 9 is a diagram illustrating the cooling paths CP1 and CP3. FIG. 9 illustrates the unit in FIG. 2 when viewed from above. In FIG. 9, the second case member 12 and the cover member 18 are indicated by broken lines.

Figure 10:
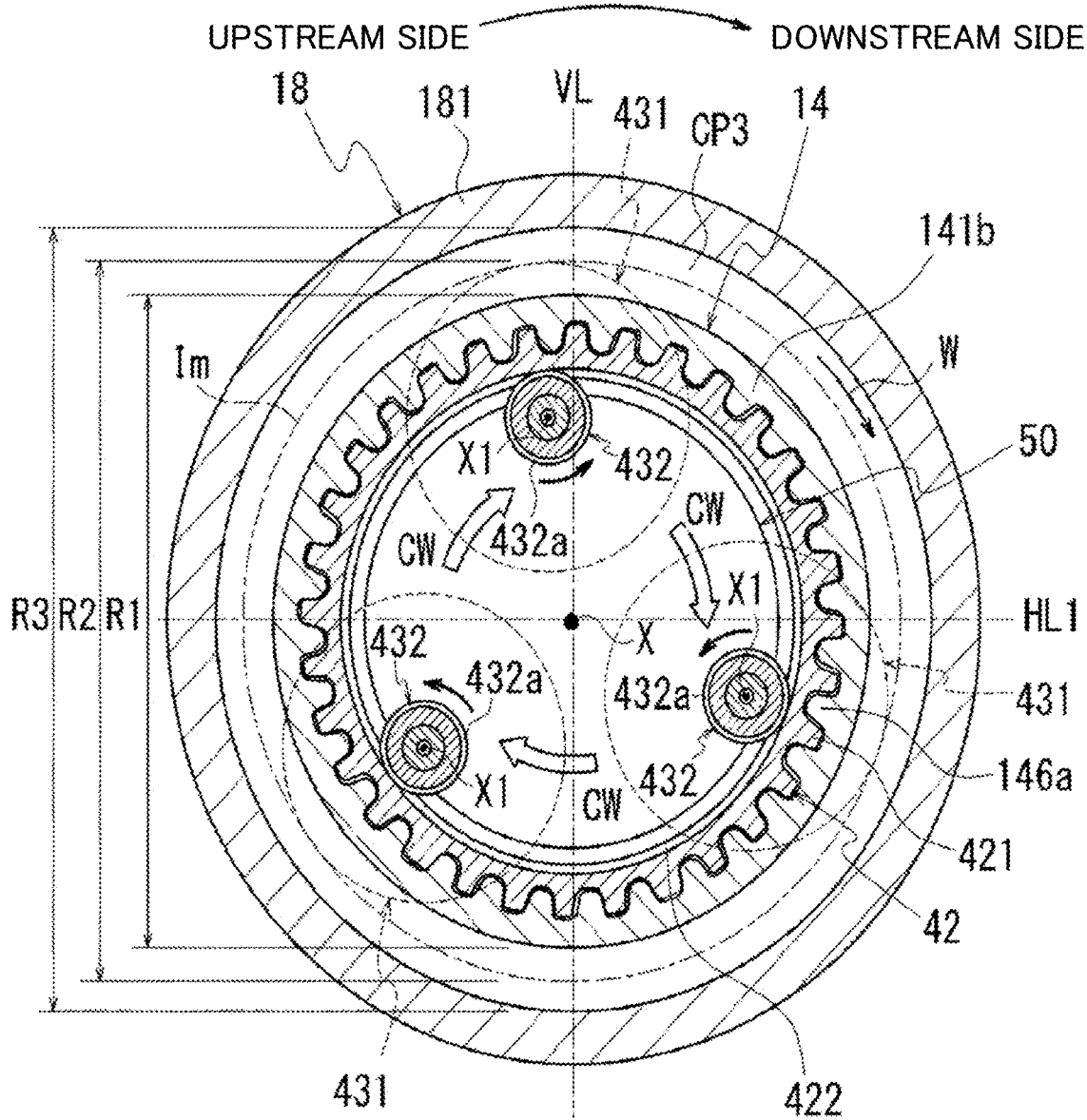
FIG. 10 is a view illustrating rotation of the differential case.

FIG. 10 is a view illustrating rotation of the differential case 50. FIG. 10 is a schematic cross-sectional view taken along line A-A in FIG. 6.

Figure 11:
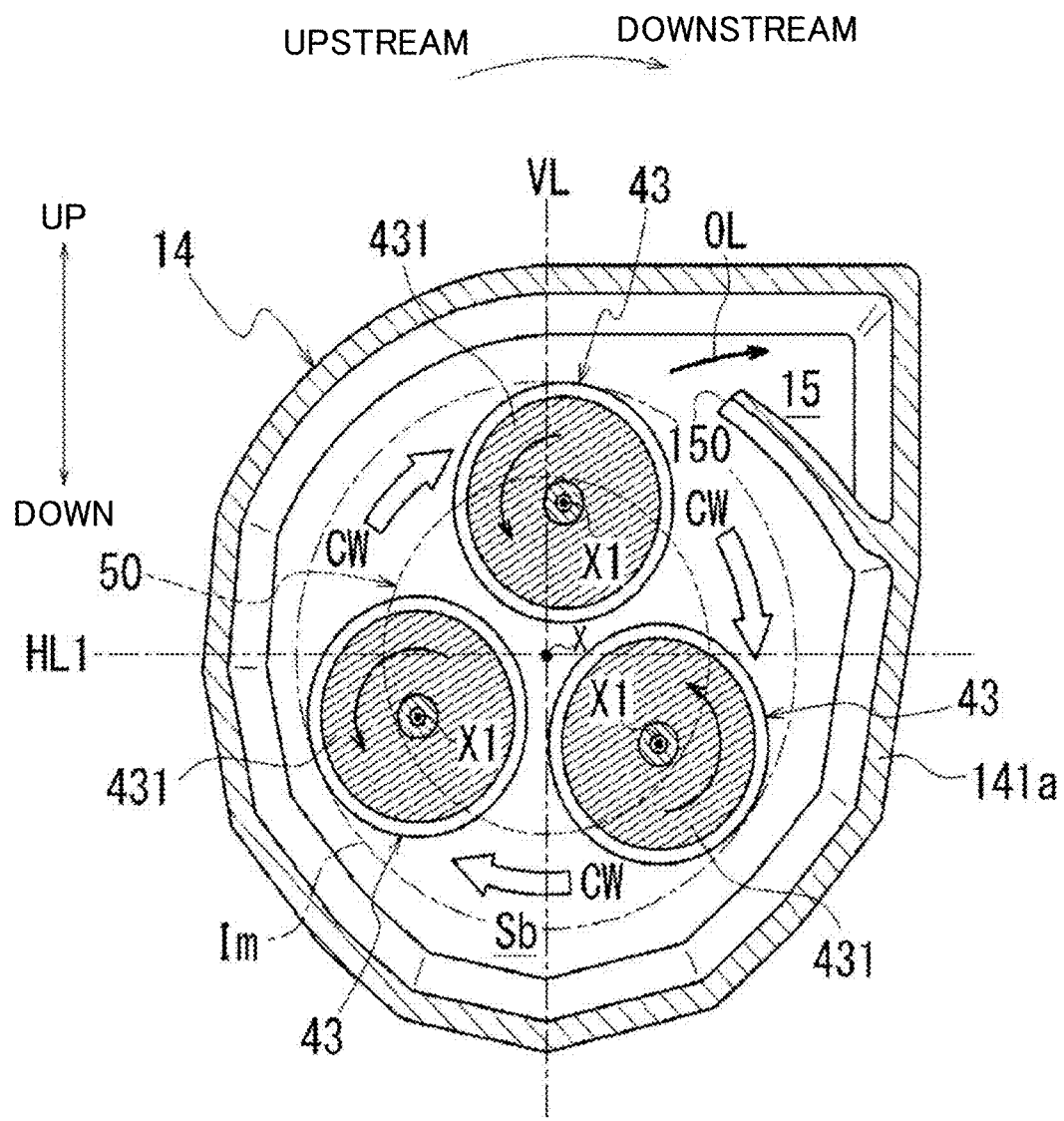
FIG. 11 is a view illustrating the rotation of the differential case.

FIG. 11 is a view illustrating the rotation of the differential case 50. FIG. 11 is a schematic cross-sectional view taken along line B-B in FIG. 6.

Figure 12:
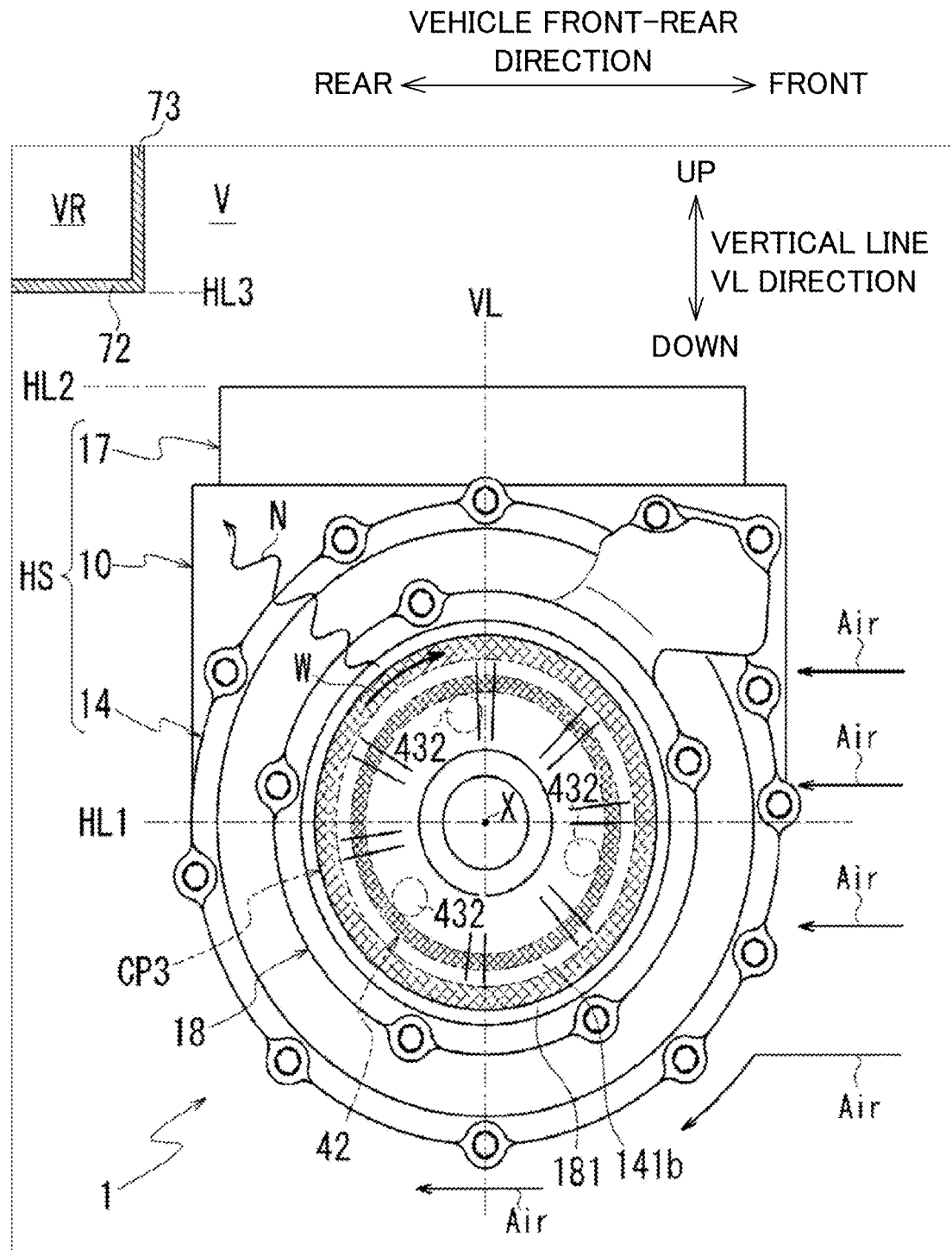
FIG. 12 is a diagram illustrating a positional relation between a vehicle room and the unit.

FIG. 12 is a diagram illustrating a positional relation between a vehicle room VR and the unit 1. FIG. 12 is an enlarged diagram of a region A in FIG. 3. In FIG. 12, regions in which the cooling path CP3 and the ring gear 42 are provided are illustrated by cross-hatching of virtual lines, respectively. A small-diameter gear portion 432 is indicated by a broken line.

As illustrated in FIG. 1, the unit 1 includes a motor 2, a power transmission mechanism 3 that transmits power output from the motor 2 to drive wheels K, K of a vehicle, and an inverter IV (see FIG. 2) that is a power conversion device of the motor 2.

A housing HS of the unit 1 is a "3-in-1" unit in which a part of a motor case 10 that accommodates the motor 2 and an inverter case 17 that accommodates the inverter IV are integrally formed.

In the present embodiment, as illustrated in FIG. 1, the unit 1 includes, as the power transmission mechanism 3, a planetary reduction gear 4 (reduction gear mechanism, planetary gear mechanism), a differential mechanism 5 (differential gear mechanism), and drive shafts 9 (9A and 9B) as output shafts.

In the unit 1, the planetary reduction gear 4, the differential mechanism 5, and the drive shafts 9 (9A and 9B) are provided along a transmission path of output rotation around a rotation axis X of the motor 2. Axes of the drive shafts 9 (9A and 9B) are coaxial with the rotation axis X of the motor 2, and the differential mechanism 5 is coaxial with the motor 2.

In the unit 1, the output rotation of the motor 2 is decelerated by the planetary reduction gear 4 and input to the differential mechanism 5, and then transmitted to the left and right drive wheels K, K of the vehicle equipped with the unit 1 via the drive shafts 9 (9A and 9B).

Here, the planetary reduction gear 4 is connected downstream of the motor 2. The differential mechanism 5 is connected downstream of the motor 2 via the planetary reduction gear 4. The drive shafts 9 (9A and 9B) are connected to downstream of the differential mechanism 5.

As illustrated in FIG. 2, the housing HS of the unit 1 is a 3-in-1 type housing, and accommodates the motor 2, the power transmission mechanism 3, and the inverter IV. The housing HS includes one or more cases. The housing HS includes, for example, the motor case 10 that accommodates the motor 2, a gear case 14 that accommodates the power transmission mechanism 3, and the inverter case 17 that accommodates the inverter IV. The gear case 14 is joined to one end of the motor case 10 in a rotation axis X direction. The inverter case 17 is joined above the motor case 10 in a vertical line VL direction in a state in which the unit 1 is mounted on the vehicle.

The inverter IV is an electronic component including a smoothing capacitor, a power semi-conductor element, a driver board, and the like. The inverter IV is electrically connected to the motor 2 inside the motor case 10 by wiring (not illustrated).

As illustrated in FIG. 3, the vehicle room VR of the vehicle V is surrounded by a roof panel 71, a floor panel 72, and a dash panel 73. The unit 1 is provided in front of the vehicle room VR extending in a vehicle front-rear direction, and is connected to front wheels of the vehicle V. The drive shaft 9B is connected to the drive wheel K on a right side of the vehicle on a front side of the drawing. Although not illustrated, the drive shaft 9A is connected to the drive wheel K on a left side of the vehicle on a back side of the drawing.

A battery B is disposed below the floor panel 72. The battery B is electrically connected to the inverter IV (see FIG. 2) inside the inverter case 17 by wiring (not illustrated).

A horizontal line HL2 passing through an uppermost surface of the inverter case 17 is positioned below a horizontal line HL3 passing through the floor panel 72 in the vertical line VL direction.

The motor 2 has a portion that overlaps the differential mechanism 5 (differential gear mechanism) when viewed in an axial direction (see FIG. 4). Here, "when viewed in an axial direction" means when viewed from the rotation axis X direction.

When viewed in the axial direction, the motor 2 has a portion that overlaps the planetary reduction gear 4 (reduction gear mechanism).

When viewed in the axial direction, the planetary reduction gear 4 (reduction gear mechanism) has a portion that overlaps the differential mechanism 5 (differential gear mechanism).

When viewed in the axial direction, the planetary reduction gear 4 (reduction gear mechanism) has a portion that overlaps the motor 2.

When viewed in the axial direction, the differential mechanism 5 (differential gear mechanism) has a portion that overlaps the planetary reduction gear 4 (reduction gear mechanism).

When viewed in the axial direction, the differential mechanism 5 (differential gear mechanism) has a portion that overlaps the motor 2.

When viewed in the axial direction, the motor 2 has a portion that overlaps the differential mechanism 5 (differential gear mechanism).

As illustrated in FIG. 4, the motor case 10 includes a first case member 11, the second case member 12 fitted onto the first case member 11, and a cover member 13 joined to one end of the first case member 11. The first case member 11 includes a cylindrical support wall portion 111 and a flange-shaped joint portion 112 provided at one end 111a of the support wall portion 111.

The support wall portion 111 is provided in a direction along the rotation axis X of the motor 2. The motor 2 is accommodated inside the support wall portion 111.

The second case member 12 includes a cylindrical peripheral wall portion 121, a flange-shaped joint portion 122 provided at one end 121a of the peripheral wall portion 121, and a flange-shaped joint portion 123 provided at the other end 121b of the peripheral wall portion 121.

The peripheral wall portion 121 of the second case member 12 is formed with an inner diameter that allows the peripheral wall portion 121 to be fitted onto the support wall portion 111 of the first case member 11.

The first case member 11 and the second case member 12 are assembled to each other by fitting the peripheral wall portion 121 of the second case member 12 onto the support wall portion 111 of the first case member 11.

The joint portion 122 at the one end 121a of the peripheral wall portion 121 comes into contact with the joint portion 112 of the first case member 11 from the rotation axis X direction. These joint portions 122 and 112 are connected to each other with bolts (not illustrated).

As illustrated in FIG. 8, the thick portions 118 and 119 are provided at the one end 111a and the other end 111b of the support wall portion 111. The thick portions 118 and 119 protrude radially outward from an outer periphery of the support wall portion 111. A radial thickness H2 of the thick portions 118 and 119 is thicker than a radial thickness H1 (see FIG. 4) of the support wall portion 111.

The thick portions 118 and 119 are provided over entire circumference of the support wall portion 111 in a circumferential direction around the rotation axis X. Seal grooves 113 and 113 are each provided in outer periphery surfaces of the thick portions 118 and 119. The seal grooves 113 and 113 are provided along the circumferential direction around the rotation axis X, and are each provided over entire circumferences of the thick portions 118 and 119 in the circumferential direction around the rotation axis X.

As illustrated in FIG. 4, seal members C and C are fitted and attached onto the seal grooves 113 and 113. The seal members C and C are pressed against an inner periphery of the peripheral wall portion 121 fitted onto the support wall portion 111 to seal gaps between the outer periphery of the support wall portion 111 and the inner periphery of the peripheral wall portion 121.

As illustrated in FIG. 8, the protrusion 111c is provided on the outer periphery of the support wall portion 111 of the first case member 11. The protrusion 111c is provided in a region between the thick portions 118 and 119 in the rotation axis X direction. A radial thickness (protrusion height) of the protrusion 111c in the radial direction of the rotation axis X is the same as the radial thickness H2 of the thick portions 118 and 119.

As illustrated in FIG. 9, the protrusion 111c is a wall that extends in the circumferential direction around the rotation axis X and surrounds the rotation axis X with a gap therebetween. The protrusion 111c is provided over the entire circumference of the support wall portion 111 along the circumferential direction around the rotation axis X. The protrusion 111c is provided with a phase shift in the circumferential direction around the rotation axis X, and is provided in a spiral shape whose position in the rotation axis X direction varies from the one end 111a toward the other end 111b of the support wall portion 111. When viewed in the radial direction, the protrusion 111c is provided along a straight line Lq1 inclined from a straight line Lp1 orthogonal to the rotation axis X. An angle θ1 formed by the straight line Lp1 and the straight line Lq1 is a lead angle forming a spiral.

At the one end 111a of the support wall portion 111, the protrusion 111c is connected to the thick portion 118 via a connection wall 111d. At the other end 111b of the support wall portion 111, the protrusion 111c is connected to the thick portion 119 via a connection wall 111e. The connection walls 111d and 111e are each provided along the rotation axis X. A protrusion height (thickness) of the connection walls 111d and 111e in the radial direction of the rotation axis X is the same as the thickness H2 (see FIG. 8) of the protrusion 111c and the thick portions 118 and 119.

As illustrated in FIG. 8 and FIG. 9, the peripheral wall portion 121 of the second case member 12 is fitted onto the support wall portion 111 of the first case member 11 (see broken lines in FIG. 8 and FIG. 9).

The peripheral wall portion 121 of the second case member 12 comes into contact with the thick portions 118 and 119 of the support wall portion 111 of the first case member 11, the protrusion 111c, and the connection walls 111d and 111e.

Accordingly, a spiral space, which continues from the one end 111a of the support wall portion 111 toward the other end 111b, is formed between the peripheral wall portion 121 and the support wall portion 111. The spiral space forms a cooling path CP1 through which the cooling water W (see FIG. 7), which is a coolant, flows. The cooling water W exchanges heat with the motor 2 accommodated inside the support wall portion 111 via the support wall portion 111. In FIG. 7, the spiral cooling path CP1 is simplified and illustrated as a straight line.

As illustrated in FIG. 9, in the cooling path CP1, a portion surrounded by the protrusion 111c, the thick portion 118, and the connection wall 111d at the one end 111a of the support wall portion 111 serves as an inlet CP1a for the cooling water W. Further, in the cooling path CP1, a portion surrounded by the protrusion 111c, the thick portion 119, and the connection wall 111e at the other end 111b of the support wall portion 111 serves as an outlet CP1b for the cooling water W. The inlet CP1a and the outlet CP1b for the cooling water W correspond to a start point and an end point of the spiral space, respectively.

As illustrated in FIG. 8, one end of a pipe P1 is connected to the inlet CP1a of the cooling path CP1. The other end of the pipe P1 is connected to a cooling path CP2 of the inverter case 17, which will be described later. One end of a pipe P2 is connected to the outlet CP1b of the cooling path CP1. The other end of the pipe P2 is connected to the cooling path CP3 of the gear case 14, which will be described later.

The pipes P1 and P2 are each provided to penetrate the peripheral wall portion 121 of the second case member 12.

As illustrated in FIG. 4, a wall portion 120 (cover) extending radially inward is provided at the other end 121b of the second case member 12. The wall portion 120 is provided in a direction orthogonal to the rotation axis X. An opening 120a through which the drive shaft 9A is inserted is provided in a region of the wall portion 120 that intersects the rotation axis X.

A motor support portion 125 extending toward the motor 2 is provided on a surface of the wall portion 120 closer to the motor 2 (right side in the drawing). The motor support portion 125 has a tubular shape surrounding the opening 120a with a gap therebetween.

The motor support portion 125 is inserted inside a coil end 253b, which will be described later. The motor support portion 125 faces an end portion 21b of a rotor core 21 with a gap therebetween in the rotation axis X direction. A bearing B1 is supported on an inner periphery of the motor support portion 125. An outer periphery of a motor shaft 20 is supported by the motor support portion 125 via the bearing B1.

A tubular wall portion 126 extending toward the differential mechanism 5 is provided on a surface of the wall portion 120 closer to the differential mechanism 5 (left side in the drawing). The tubular wall portion 126 has a tubular shape surrounding the opening 120a. A bearing B2 is supported on an inner periphery of the tubular wall portion 126. The bearing B2 supports a tubular wall portion 61 of the differential case 50, which will be described later.

As illustrated in FIG. 4, the cover member 13 includes a wall portion 130 orthogonal to the rotation axis X and a joint portion 132.

When viewed from the first case member 11, the cover member 13 is positioned on an opposite side (right side in the drawing) to the differential mechanism 5. The joint portion 132 of the cover member 13 is joined to the joint portion 112 of the first case member 11 from the rotation axis X direction. The cover member 13 and the first case member 11 are connected to each other with bolts (not illustrated). In this state, in the first case member 11, an opening of the support wall portion 111 closer to the joint portion 112 (right side in the drawing) is closed by the cover member 13.

In the cover member 13, an insertion hole 130a for the drive shaft 9A is provided in a central portion of the wall portion 130.

A lip seal RS is provided on an inner periphery of the insertion hole 130a. The lip seals RS bring lip portions (not illustrated) into elastic contact with an outer periphery of the drive shaft 9A. A gap between the inner periphery of the insertion hole 130a and the outer periphery of the drive shaft 9A is sealed by the lip seal RS.

A peripheral wall portion 131 surrounding the insertion hole 130a is provided on a surface of the wall portion 130 closer to the first case member 11 (left side in the drawing). The drive shaft 9A is supported on an inner periphery of the peripheral wall portion 131 via a bearing B4.

A motor support portion 135 and a connection wall 136 are provided on an inner diameter side of the joint portion 132. The motor support portion 135 is provided closer to the motor 2 (left side in the drawing) when viewed from the peripheral wall portion 131. The motor support portion 135 has a tubular shape surrounding the rotation axis X with a gap therebetween.

The cylindrical connection wall 136 is connected to an outer periphery of the motor support portion 135. The connection wall 136 is formed with a larger outer diameter than the peripheral wall portion 131 in the wall portion 130 (right side in the drawing). The connection wall 136 is provided along the rotation axis X and extends away from the motor 2. The connection wall 136 connects the motor support portion 135 and the joint portion 132.

One end 20a of the motor shaft 20 penetrates an inner side of the motor support portion 135 from the motor 2 side to the peripheral wall portion 131 side.

A bearing B1 is supported on an inner periphery of the motor support portion 135. The outer periphery of the motor shaft 20 is supported by the motor support portion 135 via the bearing B1.

The lip seal RS is provided at a position adjacent to the bearing B1.

Oil holes 136a and 136b are provided in an inner periphery of the connection wall 136. Oil OL flows from the oil hole 136a into a space (internal space Sc) surrounded by the connection wall 136. The oil OL flowing into the internal space Sc is discharged from the oil hole 136b. The lip seal RS is provided to prevent the oil OL in the connection wall 136 from flowing into the motor 2.

As illustrated in FIG. 4, the gear case 14 includes a peripheral wall portion 141 and a flange-shaped joint portion 142 provided at an end portion of the peripheral wall portion 141 closer to the motor case 10. A support portion 145 for a bearing B2, which will be described later, is provided at an end portion of the peripheral wall portion 141 on a side (left side in the drawing) opposite to the joint portion 142. The peripheral wall portion 141 includes a tubular wall portion 141a connected to the joint portion 142, an inclined portion 141c (inclined surface) connected to the support portion 145, and a connection wall portion 141b connecting the tubular wall portion 141a and the inclined portion 141c. The tubular wall portion 141a and the connection wall portion 141b are gradually reduced in diameter from the joint portion 142 and connected to the inclined portion 141c. The inclined portion 141c is inclined in a direction in which an inner diameter decreases from the connection wall portion 141b toward the support portion 145. The planetary reduction gear 4 and the differential mechanism 5, which are the power transmission mechanism 3, are accommodated inside the peripheral wall portion 141.

As illustrated in FIG. 6, the tubular wall portion 141a and the connection wall portion 141b of the gear case 14 are each provided in a direction along the rotation axis X. An outer diameter of the tubular wall portion 141a is larger than an outer diameter of the connection wall portion 141b. A boundary between the tubular wall portion 141a and the connection wall portion 141b in the rotation axis X direction is a stepped surface 16 orthogonal to the rotation axis X.

The cover member 18 is fitted onto the gear case 14.

The cover member 18 includes a cylindrical peripheral wall portion 181 and a flange-shaped joint portion 182 provided at one end 181a of the peripheral wall portion 181.

The peripheral wall portion 181 of the cover member 18 is formed with an inner diameter that allows the peripheral wall portion 181 to be fitted onto the connection wall portion 141b of the gear case 14.

The gear case 14 and the cover member 18 are assembled to each other by fitting the peripheral wall portion 181 of the cover member 18 onto the connection wall portion 141b of the gear case 14.

The joint portion 182 of the cover member 18 is joined to the stepped surface 16 of the gear case 14 from the rotation axis X direction. The gear case 14 and the cover member 18 are connected to each other by bolts (not illustrated).

As illustrated in FIG. 8, the thick portion 143 is provided at one end of the connection wall portion 141b closer to the tubular wall portion 141a. The thick portion 144 is provided at one end of the connection wall portion 141b closer to the inclined portion 141c. The thick portions 143 and 144 protrude radially outward from an outer periphery of the connection wall portion 141b. A radial thickness H4 of the thick portions 143 and 144 is greater than a radial thickness H3 of the connection wall portion 141b (see FIG. 6).

The thick portions 143 and 144 are provided over entire circumference of the connection wall portion 141b in the circumferential direction around the rotation axis X. Seal grooves 146 and 146 are each provided in outer periphery surfaces of the thick portions 143 and 144. The seal grooves 146 and 146 are provided along the circumferential direction around the rotation axis X, and are each provided over entire circumferences of the thick portions 143 and 144 in the circumferential direction around the rotation axis X.

As illustrated in FIG. 6, seal members C and C are fitted and attached to the seal grooves 146 and 146. The seal members C and C are pressed against an inner periphery of the peripheral wall portion 181 fitted onto the connection wall portion 141b to seal gaps between the outer periphery of the connection wall portion 141b and the inner periphery of the peripheral wall portion 181.

As illustrated in FIG. 8, a protrusion 141b1 is provided on the outer periphery of the connection wall portion 141b of the gear case 14. The protrusion 141b1 is provided in a region between the thick portions 143 and 144 in the rotation axis X direction. A radial thickness (protrusion height) of the protrusion 141b1 in the radial direction of the rotation axis X is the same as the radial thickness H4 of the thick portions 143 and 144.

As illustrated in FIG. 9, the protrusion 141b1 is a wall that extends in the circumferential direction around the rotation axis X and surrounds the rotation axis X with a gap therebetween. The protrusion 141b1 is provided over the entire circumference of the connection wall portion 141b along the circumferential direction around the rotation axis X. The protrusion 141b1 is provided with a phase shift in the circumferential direction around the rotation axis X, and is provided in a spiral shape whose position in the rotation axis X direction varies from the tubular wall portion 141a toward the inclined portion 141c. When viewed in the radial direction, the protrusion 141b1 is provided along a straight line Lq2 inclined from a straight line Lp2 orthogonal to the rotation axis X. An angle θ2 formed by the straight line Lp2 and the straight line Lq2 is a lead angle forming a spiral.

On a side of the connection wall portion 141b closer to the tubular wall portion 141a, the protrusion 141b1 is connected to the thick portion 143 via a connection wall 141f. On a side of the connection wall portion 141b closer to the inclined portion 141c, the protrusion 141b1 is connected to the thick portion 144 via a connection wall 141g. The connection walls 141f and 141g are each provided in a direction along the rotation axis X. A protrusion height (thickness) of the connection walls 141f and 141g in the radial direction of the rotation axis X is the same as the thickness H4 (see FIG. 8) of the protrusion 141b1 and the thick portions 143 and 144.

As illustrated in FIG. 8 and FIG. 9, the peripheral wall portion 181 of the cover member 18 is fitted onto the connection wall portion 141b of the gear case 14 (see broken lines in FIG. 8 and FIG. 9).

The thick portions 143 and 144 of the connection wall portion 141b of the gear case 14, the protrusion 141b1, and the connection walls 141f and 141g come into contact with the peripheral wall portion 181 of the cover member 18.

Accordingly, a spiral space, which continues from the tubular wall portion 141a toward the inclined portion 141c, is formed between the peripheral wall portion 181 and the connection wall portion 141b. The spiral space forms the cooling path CP3 through which the cooling water W (see FIG. 7), which is a coolant, flows. The cooling water W exchanges heat with the planetary reduction gear 4 (see FIG. 4) accommodated inside the connection wall portion 141b through the connection wall portion 141b. In FIG. 7, the spiral cooling path CP3 is simplified and illustrated as a straight line.

As illustrated in FIG. 9, in the cooling path CP3, a portion surrounded by the protrusion 141b1, the thick portion 143, and the connection wall 141f closer to the tubular wall portion 141a serves as an inlet CP3a for the cooling water W. Further, in the cooling path CP3, a portion surrounded by the protrusion 141b1, the thick portion 144, and the connection wall 141g closer to the inclined portion 141c serves as an outlet CP3b for the cooling water W. The inlet CP3a and the outlet CP3b for the cooling water W correspond to a start point and an end point of the spiral space, respectively.

As illustrated in FIG. 8, the other end of the pipe P2 is connected to the inlet CP3a of the cooling path CP3. The one end of the pipe P2 is connected to the outlet CP1b of the cooling path CP1 of the motor case 10. One end of a pipe P3 is connected to the outlet CP3b of the cooling path CP3. The other end of the pipe P3 is connected to an oil cooler 83, which will be described later.

The pipes P2 and P3 are each provided to penetrate the peripheral wall portion 181 of the cover member 18.

As illustrated in FIG. 4, the gear case 14 is positioned closer to the differential mechanism 5 (left side in the drawing) when viewed from the motor case 10. The joint portion 142 of the gear case 14 is joined to the joint portion 123 of the second case member 12 of the motor case 10 from the rotation axis X direction. The gear case 14 and the second case member 12 are connected to each other with bolts (not illustrated). A mating surface T between the joint portion 142 of the gear case 14 and the joint portion 123 of the second case member 12 is orthogonal to the rotation axis X.

When viewed in the radial direction of the rotation axis X, the cooling paths CP1 and CP3 extend in a direction away from the mating surface T along the rotation axis X.

A space formed inside the joined motor case 10 and gear case 14 is divided into two spaces by the wall portion 120 (cover) of the second case member 12. A side of the wall portion 120 in the motor case 10 is a motor chamber Sa that accommodates the motor 2, and a side of the wall portion 120 in the gear case 14 is a gear chamber Sb that accommodates the planetary reduction gear 4 and the differential mechanism 5. The wall portion 120 as the cover is sandwiched between the motor 2 and the differential mechanism 5 inside the housing HS.

The cover referred to here may have a portion accommodated in the housing HS, or the entire cover may be accommodated in the housing HS like the wall portion 120. The cover may be, for example, separate from the second case member 12. In this case, the cover may be sandwiched and fixed between the motor case 10 and the gear case 14. A part of the cover may be exposed outside of the housing HS.

As illustrated in FIG. 4, the motor 2 includes the cylindrical motor shaft 20, the cylindrical rotor core 21 fitted onto the motor shaft 20, and a stator core 25 surrounding an outer periphery of the rotor core 21 with a gap therebetween.

In the motor shaft 20, the bearings B1 and B1 are fitted and fixed to both sides of the rotor core 21.

The bearing B1 positioned on the one end 20a (right side in the drawing) of the motor shaft 20 when viewed from the rotor core 21 is supported on the inner periphery of the motor support portion 135 of the cover member 13. The bearing B1 positioned on the other end 20b (left side in the drawing) is supported on the inner periphery of the cylindrical motor support portion 125 of the second case member 12.

The motor support portions 135 and 125 are disposed on inner diameter sides of coil ends 253a and 253b, which will be described later. The motor support portions 135 and 125 are respectively disposed facing the one end portion 21a and the other end portion 21b of the rotor core 21 with a gap therebetween in the rotation axis X direction.

The rotor core 21 is formed by laminating a plurality of silicon steel plates. Each of the silicon steel plates is fitted onto the motor shaft 20 in a state in which relative rotation with the motor shaft 20 is restricted.

When viewed from the rotation axis X direction of the motor shaft 20, the silicon steel plate has a ring shape. On an outer peripheral side of the silicon steel plate, N-pole and S-pole magnets (not illustrated) are alternately provided in the circumferential direction around the rotation axis X.

The stator core 25 surrounding the outer periphery of the rotor core 21 is formed by laminating a plurality of electromagnetic steel plates. The stator core 25 is fixed to an inner periphery of the cylindrical support wall portion 111 of the first case member 11.

Each of the electromagnetic steel plates includes a ring-shaped yoke portion 251 fixed to the inner periphery of the support wall portion 111, and a teeth portion 252 protruding from an inner periphery of the yoke portion 251 toward the rotor core 21.

In the present embodiment, the stator core 25 in which a winding 253 is wound around a plurality of teeth portions 252 in a distributed manner is adopted. The stator core 25 is longer than the rotor core 21 in the rotation axis X direction by lengths of the coil ends 253a and 253b protruding in the rotation axis X direction.

A stator core in which windings are concentratedly wound around each of the plurality of teeth portions 252 protruding toward the rotor core 21 may be adopted.

The opening 120a is provided in the wall portion 120 (motor support portion 125) of the second case member 12. The other end 20b of the motor shaft 20 penetrates through the opening 120a to the differential mechanism 5 (left side in the drawing) and is positioned in the gear case 14.

The other end 20b of the motor shaft 20 faces a side gear 54A, which will be described later, inside the gear case 14 with a gap therebetween in the rotation axis X direction.

The lip seal RS is inserted between the motor shaft 20 and the opening 120a of the wall portion 120.

The oil OL for lubricating the planetary reduction gear 4 and the differential mechanism 5 is sealed on an inner diameter side of the gear case 14.

The lip seal RS is provided to prevent the oil OL in the gear case 14 from flowing into the motor case 10.

As illustrated in FIG. 5, a sun gear 41 of the planetary reduction gear 4 is spline-fitted in a region of the motor shaft 20 positioned in the gear case 14.

A tooth portion 41a is formed on an outer periphery of the sun gear 41, and a large-diameter gear portion 431 of a stepped pinion gear 43 meshes with the tooth portion 41a.

The stepped pinion gear 43 includes the large-diameter gear portion 431 (large pinion) that meshes with the sun gear 41 and the small-diameter gear portion 432 (small pinion) that has a smaller diameter than the large-diameter gear portion 431.

The large-diameter gear portion 431 and the small-diameter gear portion 432 are integrated gear components disposed side by side in a direction of an axis X1 parallel to the rotation axis X.

As illustrated in FIG. 6, a pinion shaft 44 penetrates inner diameter sides of the large-diameter gear portion 431 and the small-diameter gear portion 432. The stepped pinion gear 43 is rotatably supported on an outer periphery of the pinion shaft 44 via needle bearings NB and NB.

A tooth portion 432a of the small-diameter gear portion 432 meshes with inner peripheral teeth 422 of the ring gear 42. The ring gear 42 has a ring shape surrounding the rotation axis X with a gap therebetween. A plurality of engagement teeth 421 protruding outward in the radial direction are provided on an outer periphery of the ring gear 42. The plurality of engagement teeth 421 are provided around the rotation axis X in the circumferential direction at intervals.

The engagement teeth 421 provided on the outer periphery of the ring gear 42 are spline-fitted to tooth portions 146a provided on an inner periphery of the connection wall portion 141b. Accordingly, the ring gear 42 is restricted from rotating around the rotation axis X.

As illustrated in FIG. 5, the differential mechanism 5 includes the differential case 50 (differential case) as an input element, a drive shaft (output shaft) as an output element, and a differential gear set as a differential element. Although detailed description is omitted, the differential case 50 may be configured by two case members assembled in the rotation axis X direction.

The differential case 50 also functions as a carrier that supports the stepped pinion gear 43 of the planetary reduction gear 4. The stepped pinion gear 43 is rotatably supported by the differential case 50 via the pinion shaft 44. As illustrated in FIG. 11, three stepped pinion gears 43 are disposed at intervals in the circumferential direction around the rotation axis X.

As illustrated in FIG. 5, in the differential case 50, as the differential gear set, a pinion mate gear 52, which is a bevel gear type differential gear, and side gears 54A and 54B are provided. The pinion mate gear 52 is supported by a pinion mate shaft 51.

The pinion mate shaft 51 includes a central member 510 disposed on the rotation axis X and a shaft member 511 connected to an outer diameter side of the central member 510. Although not illustrated, a plurality of shaft members 511 are provided at equal intervals in the circumferential direction around the rotation axis X. The shaft member 511 is inserted through a support hole 69 of the differential case 50 extending in the radial direction and supported.

The pinion mate gear 52 is fitted onto each of the shaft members 511 one by one and is rotatably supported.

As illustrated in FIG. 5, in the differential case 50, the side gear 54A is positioned on one side of the central member 510 in the rotation axis X direction, and the side gear 54B is positioned on the other side of the central member 510. The side gears 54A and 54B are each rotatably supported by the differential case 50.

The side gear 54A meshes with the pinion mate gear 52 from one side in the rotation axis X direction. The side gear 54B meshes with the pinion mate gear 52 from the other side in the rotation axis X direction.

An opening 60 and the tubular wall portion 61 surrounding the opening 60 are provided in a central portion on one end side (right side in the drawing) of the differential case 50. The tubular wall portion 61 extends toward the motor case 10. An outer periphery of the tubular wall portion 61 is supported by the wall portion 120 of the second case member 12 via the bearing B2.

The drive shaft 9A inserted through the opening 60 is inserted into the differential case 50 from the rotation axis X direction.

As illustrated in FIG. 4, the drive shaft 9A penetrates the insertion hole 130a of the wall portion 130 of the cover member 13, and is provided across the inner diameter sides of the motor shaft 20 of the motor 2 and the sun gear 41 (see FIG. 5) of the planetary reduction gear 4 in the rotation axis X direction.

As illustrated in FIG. 5, a through hole 65 and a tubular wall portion 66 surrounding the through hole 65 are formed in a central portion of the other end side (left side in the drawing) of the differential case 50. A bearing B2 is fitted onto the tubular wall portion 66. The bearing B2 fitted onto the tubular wall portion 66 is held by the support portion 145 of the gear case 14. The tubular wall portion 66 of the differential case 50 is rotatably supported by the gear case 14 via the bearing B2.

The drive shaft 9B penetrating an opening 145a of the gear case 14 is inserted into the support portion 145 from the rotation axis X direction. The drive shaft 9B is rotatably supported by the support portion 145. The tubular wall portion 66 functions as a shaft support portion that supports an outer periphery of the drive shaft 9B.

The lip seal RS is fixed to an inner periphery of the opening 145a. Lip portions (not illustrated) of the lip seals RS come into elastic contact with an outer periphery of a tubular wall portion 540 of the side gear 54B fitted onto the drive shaft 9B.

Accordingly, a gap between the outer periphery of the tubular wall portion 540 of the side gear 54B and the inner periphery of the opening 145a is sealed.

As illustrated in FIG. 5, inside the differential case 50, distal end portions of the drive shafts 9 (9A and 9B) face each other with a gap therebetween in the rotation axis X direction.

The side gears 54A and 54B supported by the differential case 50 are spline-fitted to outer peripheries of distal end portions of the drive shafts 9 (9A and 9B). The side gears 54A and 54B and the drive shafts 9 (9A and 9B) are coupled to each other so as to be integrally rotatable around the rotation axis X.

In this state, the side gears 54A and 54B are disposed facing each other with a gap therebetween in the rotation axis X direction. The central member 510 of the pinion mate shaft 51 is positioned between the side gears 54A and 54B.

The pinion mate gear 52 of the pinion mate shaft 51 is assembled to the side gear 54A positioned on one side in the rotation axis X direction and the side gear 54B positioned on the other side in a state in which teeth portions thereof are meshed with each other.

As illustrated in FIG. 5, a support hole 62 at one end 44a of the pinion shaft 44 is formed on an outer diameter side of the opening 60 on the one end side (right side in the drawing) of the differential case 50. A support hole 68 at the other end 44b of the pinion shaft 44 is formed at the other end (left side in the drawing) of the differential case 50.

The support holes 62 and 68 are formed at overlapping positions in the rotation axis X direction. The support holes 62 and 68 are formed at intervals in the circumferential direction around the rotation axis X according to a position where the stepped pinion gear 43 is disposed. The one end 44a of the pinion shaft 44 is inserted into the support hole 62, and the other end 44b is inserted into the support hole 68. The other end 44b of the pinion shaft 44 is press-fitted into the support hole 68, so that the pinion shaft 44 is fixed to the differential case 50 so as not to be rotatable relative to the differential case 50. The stepped pinion gear 43 fitted onto the pinion shaft 44 is rotatably supported around the axis X1 parallel to the rotation axis X.

As illustrated in FIG. 5, the oil OL for lubrication is stored inside the gear case 14. When the differential case 50 rotates around the rotation axis X, the oil OL is scraped up by the differential case 50.

Although detailed description is omitted, an oil passage, an oil hole, and the like for introducing the oil OL scraped up by the differential case 50 are provided in the differential case 50, the pinion shaft 44, and the like. Accordingly, the oil OL is easily introduced into rotating members such as the bearing B2 and the needle bearing NB (see FIG. 6).

As illustrated in FIG. 11, a catch tank 15 is provided in the gear case 14 above a space that accommodates the differential case 50. The catch tank 15 is positioned on one side (right side in the drawing) of the vertical line VL orthogonal to the rotation axis X. The catch tank 15 communicates with the gear chamber Sb via a communication port 150. The oil OL scraped up by the differential case 50 and scattered flows into the catch tank 15 and is collected.

As illustrated in FIG. 10, the tooth portion 432$a$ of the small-diameter gear portion 432 meshes with the inner peripheral teeth 422 of the ring gear 42 fixed to an inner periphery of the gear case 14.

When the vehicle V is viewed from the right side as illustrated in FIG. 3 and the vehicle V on which the unit 1 is mounted travels forward, the small-diameter gear portion 432 revolves in a clockwise direction CW around the rotation axis X while rotating counterclockwise around the axis X1 as illustrated in FIG. 10. Accordingly, the differential case 50 rotates in the clockwise direction CW around the rotation axis X.

As illustrated in FIG. 11, the catch tank 15 is positioned on the right side of the vertical line VL, that is, on a downstream side in a rotation direction of the differential case 50. Accordingly, most of the oil OL scraped up by the differential case 50 rotating around the rotation axis X can flow into the catch tank 15.

The catch tank 15 is connected to the oil cooler 83 (see FIG. 7) via an oil passage, a pipe, or the like (not illustrated). The oil cooler 83 is connected to the oil hole 136$a$ (see FIG. 4) formed in the connection wall 136 via a pipe, an oil passage, or the like (not illustrated).

As illustrated in FIG. 4, an oil hole Ha is formed in the peripheral wall portion 141 of the gear case 14. The oil hole Ha is connected to the oil hole 136$b$ formed in the internal space Sc via a pipe (not illustrated). The oil OL discharged from the internal space Sc through the oil hole 136$b$ is supplied again into the gear chamber Sb through the oil hole Ha.

As illustrated in FIG. 10, the tooth portion 432$a$ of the small-diameter gear portion 432 meshes with the inner peripheral teeth 422 of the ring gear 42 on an outer diameter side. The engagement teeth 421 of the ring gear 42 are spline-fitted to tooth portions 146$a$ provided on the inner periphery of the connection wall portion 141$b$.

The peripheral wall portion 181 of the cover member 18 is fitted onto the connection wall portion 141$b$. The cooling path CP3 is interposed between the connection wall portion 141$b$ and the peripheral wall portion 181 in the radial direction of the rotation axis X. The cooling path CP3 surrounds the connection wall portion 141$b$ over the entire circumference in the circumferential direction around the rotation axis X. A meshing portion between the tooth portion 432$a$ of the small-diameter gear portion 432 and the inner peripheral teeth 422 of the ring gear 42 overlaps the cooling path CP3 in the radial direction of the rotation axis X.

When viewed in the rotation axis X direction, a virtual circle Im, which is a revolution trajectory drawn by an outermost periphery of the large-diameter gear portion 431 (see a broken line in the drawing), has a diameter R2 smaller than an inner diameter R3 of the peripheral wall portion 181 and larger than an outer diameter R1 of the connection wall portion 141$b$ (R1<R2<R3).

As illustrated in FIG. 6, when viewed in the radial direction of the rotation axis X, the cooling path CP3 overlaps the large-diameter gear portion 431 in the rotation axis X direction. Further, when viewed in the radial direction of the rotation axis X, the cooling path CP3 has a portion offset from the ring gear 42 toward the inclined portion 141$c$ in the rotation axis X direction.

As illustrated in FIG. 7, the unit 1 is provided with the circulation system 80 for the cooling water W.

The circulation system 80 circulates the cooling water W among the cooling path CP1 of the motor case 10, the cooling path CP2 of the inverter case 17, and the cooling path CP3 of the gear case 14. The circulation system 80 further includes the oil cooler 83, a water pump WP, and a radiator 82 between the cooling path CP3 and the cooling path CP2, which are connected by pipes or the like through which the cooling water CL flows.

The water pump WP pumps the cooling water W in the circulation system 80.

The radiator 82 is a device that dissipates heat of the cooling water W to cool the cooling water W.

The oil cooler 83 is a heat exchanger that exchanges heat between the cooling water W and the oil OL.

The cooling water W pumped to the water pump WP flows through the cooling path CP2 in the inverter case 17, and is then supplied to the oil cooler 83 through the cooling path CP1 in the motor case 10 and the cooling path CP3 in the gear case 14. The oil cooler 83 cools the oil OL by exchanging heat between the cooling water W and the oil OL. The cooling water W flowing through the oil cooler 83 is cooled by the radiator 82 and then supplied to the cooling path CP2 of the inverter case 17 again.

Here, as illustrated in FIG. 7, the cooling path CP1 is connected to the pipe P1 at the inlet CP1$a$. The pipe P1 is also connected to the cooling path CP2 of the inverter case 17. The cooling path CP1 is connected to the pipe P2 that penetrates the second case member 12 at the outlet CP1$b$. The pipe P2 penetrates the cover member 18 and is also connected to the cooling path CP3.

The cooling path CP3 is connected to the pipe P2 at the inlet CP3$a$. The cooling path CP3 is connected to the pipe P3 that penetrates the cover member 18 at the outlet CP3$b$. The pipe P3 is also connected to the oil cooler 83.

The cooling water W discharged from the cooling path CP2 of the inverter case 17 is supplied to the inlet CP1$a$ of the cooling path CP1 through the pipe P1. In the cooling path CP1, the cooling water W spirally moves inside the motor case 10 from the inlet CP1$a$ toward the outlet CP1$b$.

The cooling water W cools the motor 2 while spirally moving inside the motor case 10.

The cooling water W that has reached the outlet CP1$b$ of the cooling path CP1 is discharged from the pipe P2 to the cooling path CP3. In the cooling path CP3, the cooling water W spirally moves on an outer periphery of the gear case 14 from the inlet CP3$a$ toward the outlet CP3$b$.

The cooling water W cools an area around the ring gear 42 while spirally moving on the outer periphery of the gear case 14.

The cooling water W that has reached the outlet CP3$b$ of the cooling path CP3 is discharged from the pipe P3 to the oil cooler 83.

Functions of the unit 1 having such a configuration will be described.

As illustrated in FIG. 1, in the unit 1, the planetary reduction gear 4, the differential mechanism 5, and the drive shafts 9A and 9B are provided along the transmission path of the output rotation of the motor 2.

As illustrated in FIG. 4, when the motor 2 is driven and the rotor core 21 rotates around the rotation axis X, the motor shaft 20 rotates integrally with the rotor core 21.

As illustrated in FIG. 5, rotation of the motor shaft 20 is input to the sun gear 41 of the planetary reduction gear 4.

In the planetary reduction gear 4, the sun gear 41 serves as an input portion for the output rotation of the motor 2, and the differential case 50 supporting the stepped pinion gear 43 serves as an output portion for the input rotation.

As illustrated in FIG. 5, when the sun gear 41 rotates around the rotation axis X by the input rotation, the stepped pinion gear 43 (large-diameter gear portion 431 and small-diameter gear portion 432) rotates around the axis X1 by the rotation input from the sun gear 41.

Here, the small-diameter gear portion 432 of the stepped pinion gear 43 meshes with the ring gear 42 fixed to the inner periphery of the gear case 14. Therefore, the stepped pinion gear 43 revolves around the rotation axis X while rotating around the axis X1.

Here, in the stepped pinion gear 43, an outer diameter of the small-diameter gear portion 432 is smaller than an outer diameter of the large-diameter gear portion 431.

Accordingly, the differential case 50 supporting the stepped pinion gear 43 rotates around the rotation axis X at a rotation speed lower than that of the rotation input from the motor 2.

Therefore, the rotation input to the sun gear 41 of the planetary reduction gear 4 is greatly decelerated by the stepped pinion gear 43 and then output to the differential case 50 (differential mechanism 5).

As illustrated in FIG. 5, when the differential case 50 rotates around the rotation axis X due to the input rotation, the drive shafts 9A and 9B meshing with the pinion mate gear 52 rotate around the rotation axis X in the differential case 50. Accordingly, the left and right drive wheels K and K (see FIG. 1) of the vehicle equipped with the unit 1 are rotated by the transmitted rotational driving force.

The oil OL for lubrication is stored in the gear chamber Sb. When the output rotation of the motor 2 is transmitted, the oil OL stored in the gear chamber Sb is scraped up by the differential case 50 rotating around the rotation axis X. The scraped up oil OL lubricates a meshing portion between the sun gear 41 and the large-diameter gear portion 431, a meshing portion between the small-diameter gear portion 432 and the ring gear 42, and a meshing portion between the pinion mate gear 52 and the side gears 54A and 54B.

As illustrated in FIG. 11, the differential case 50 rotates in the clockwise direction CW around the rotation axis X.

The catch tank 15 is provided on an upper portion of the gear case 14. The catch tank 15 is positioned on the downstream side in the rotation direction of the differential case 50, and a part of the oil OL scraped up by the differential case 50 flows into the catch tank 15.

The oil OL flowing into the catch tank 15 is introduced into the oil cooler 83 (see FIG. 7) via a pipe (not illustrated) and cooled.

As illustrated in FIG. 4, the cooled oil OL is supplied to the internal space Sc formed in the connection wall 136 through the oil hole 136a. The oil OL supplied to the internal space Sc lubricates the bearing B4 and is discharged from the oil hole 136b. The oil OL discharged from the oil hole 136b is supplied into the gear chamber Sb from the oil hole Ha via a pipe (not illustrated).

Here, as illustrated in FIG. 10, the small-diameter gear portion 432 revolves around the rotation axis X by rotating around the axis X1 while meshing the tooth portion 432a with the inner peripheral teeth 422 of the ring gear 42. A temperature of the small-diameter gear portion 432 and the ring gear 42 increases due to frictional heat generated when the tooth portion 432a and the inner peripheral teeth 422 mesh with each other.

Since the small-diameter gear portion 432 revolves around the rotation axis X, the small-diameter gear portion 432 is cooled by periodically passing the oil OL accumulated in a lower portion of the gear chamber Sb.

On the other hand, the engagement teeth 421 provided on the outer periphery of the ring gear 42 are spline-fitted to the tooth portions 146a provided on the inner periphery of the connection wall portion 141b, and rotation of the ring gear 42 around the rotation axis X is restricted. Therefore, since the ring gear 42 is less likely to obtain a cooling effect by the oil OL than the small-diameter gear portion 432, the temperature of the ring gear 42 easily increases. Heat of the ring gear 42 is transmitted from the tooth portion 146a to the connection wall portion 141b.

As illustrated in FIG. 10, in the present embodiment, the cooling path CP3 is positioned on an outer peripheral side of the connection wall portion 141b. The ring gear 42, the connection wall portion 141b, and the cooling path CP3 overlap in the radial direction of the rotation axis X. Therefore, the ring gear 42 can exchange heat with the cooling water W flowing through the cooling path CP3 via the connection wall portion 141b.

Therefore, even when the temperature of the ring gear 42 increases due to engagement between the small-diameter gear portion 432 and the ring gear 42, the ring gear 42 is cooled by heat exchange with the cooling water W in the cooling path CP3.

A meshing noise N is generated when the ring gear 42 and the small-diameter gear portion 432 mesh with each other.

As illustrated in FIG. 12, the meshing noise N radially propagates outward from the ring gear 42 in the radial direction of the rotation axis X. A part of the meshing noise N reaches inside the vehicle room VR. The meshing noise N is perceived as noise leakage (noise) by the occupants of the vehicle V.

As illustrated by cross-hatching in FIG. 12, the cooling path CP3 surrounds the ring gear 42 over entire circumference in the circumferential direction around the rotation axis X. The unit 1 including the cooling path CP3 is separated from the vehicle room VR by the floor panel 72 and the dash panel 73. That is, the cooling path CP3 has a portion sandwiched between the vehicle room VR and the ring gear 42.

The meshing noise N crosses the cooling path CP3 from an inner diameter side to an outer diameter side in the radial direction when propagating outward in the radial direction of the rotation axis X. At this time, the cooling water W in the cooling path CP3 functions as a shielding object that shields propagation of the meshing noise N. Accordingly, the meshing noise N can be reduced from reaching the vehicle room VR.

As illustrated in FIG. 12, the cooling path CP3 surrounds the ring gear 42 over the entire circumference in the circumferential direction around the rotation axis X. That is, the cooling path CP3 has a portion positioned above a horizontal line HL1 passing through the rotation axis X.

The unit 1 is provided below the vehicle room VR in the vertical line VL direction. Specifically, the horizontal line HL2 passing through the uppermost surface of the inverter case 17 is disposed below the horizontal line HL3 passing through the floor panel 72 in the vertical line VL direction. That is, the cooling path CP3 has a portion sandwiched between the vehicle room VR and the ring gear 42 in the vertical line VL direction. Accordingly, even when the unit 1 is disposed directly below the vehicle room VR, the meshing noise N can be reduced from reaching the vehicle room VR.

As illustrated in FIG. 8 and FIG. 9, the protrusion 141b1 that constitutes the cooling path CP3 is provided over the entire circumference of the connection wall portion 141b along the circumferential direction around the rotation axis X. The protrusion 141b1 is provided in a spiral shape whose position in the rotation axis X direction varies from the tubular wall portion 141a toward the inclined portion 141c.

A centrifugal force due to revolution of the small-diameter gear portion 432 acts on the ring gear 42 and the connection wall portion 141b that supports the ring gear 42. Due to the centrifugal force, stress is generated in the connection wall portion 141b in a direction spreading outward in the radial direction of the rotation axis X. By providing the spiral protrusion 141b1 on the connection wall portion 141b, the protrusion 141b1 functions as a rib. Accordingly, a rigidity of the connection wall portion 141b with respect to the stress in the direction spreading outward in the radial direction of the rotation axis X can be increased. By increasing the rigidity of the connection wall portion 141b, deformation of the gear case 14 can be reduced. Further, vibration of the gear case 14 due to an excitation force generated in the ring gear 42 as the small-diameter gear portion 432 and the ring gear 42 mesh with each other can be reduced, and generation of noise due to the vibration of the gear case 14 can be reduced.

Further, by providing the protrusion 141b1, a volume of a region of the connection wall portion 141b that supports the ring gear 42 can be increased (thickness increased). Accordingly, a function of shielding the meshing noise N of the gear case 14 itself is also improved. In particular, as illustrated in FIG. 6, by providing the protrusion 141b1 at a position overlapping the ring gear 42 in the radial direction of the rotation axis X, an effect of shielding the meshing noise N is improved compared with a case in which the protrusion 141b1 is provided at a position offset from the ring gear 42 in the direction of the rotation axis X.

As illustrated in FIG. 3, the unit 1 is connected to front wheels of the vehicle V, and is disposed in front of the vehicle room VR in the vehicle front-rear direction.

As illustrated in FIG. 12, when the vehicle V travels forward, the unit 1 receives traveling air Air from the front of the vehicle. In this case, a region of the unit 1 on a vehicle front side of the vertical line VL passing through the rotation axis X receives a large amount of traveling air Air. A region of the gear case 14 on the vehicle front side of the vertical line VL passing through the rotation axis X also receives a large amount of traveling air Air. Most of the traveling air Air received by the gear case 14 on the vehicle front side passes through a region below the horizontal line HL1 and passes to a vehicle rear side.

As described above, the cooling path CP3 surrounds the ring gear 42 over the entire circumference in the circumferential direction around the rotation axis X.

That is, the cooling path CP3 has a portion offset from the ring gear 42 in the radial direction on an opposite side of the vehicle room VR in the vehicle front-rear direction (on the vehicle front side of the vertical line VL).

Further, the cooling path CP3 has a portion offset from the ring gear 42 in the radial direction below the horizontal line HL1 in the vertical line VL direction.

The cooling water W flowing through the cooling path CP3 is cooled by heat exchange with the traveling air Air in the region on the vehicle front side of the vertical line VL and the region below the horizontal line HL1.

In the unit 1 according to the present embodiment, in addition to the radiator 82 (see FIG. 7), the cooling water W can be cooled using the traveling air Air when passing through the cooling path CP3, and thus cooling efficiency of the cooling water W is improved. Therefore, even a small amount of the cooling water W can effectively cool the unit 1. Since a total amount of the cooling water W used in the unit 1 can be reduced while maintaining the cooling efficiency, a weight of the unit 1 can be reduced.

Hereinafter, examples of the unit 1 according to an aspect of the present invention will be listed.

(1) The unit 1 includes the housing HS that accommodates the planetary reduction gear 4 (planetary gear mechanism).

The housing HS includes the cooling path CP3 (flow path) through which the cooling water W (coolant) flows.

The planetary reduction gear 4 includes the ring gear 42 fixed to the housing HS.

When viewed in the radial direction of the rotation axis X of the planetary reduction gear 4 (when viewed in the radial direction), the cooling path CP3 has a portion that overlaps the ring gear 42.

With this configuration, a space around the ring gear 42 can be utilized to dispose the cooling path CP3. Accordingly, a contact area between the housing HS and the cooling water W is increased, and thus the heat exchange efficiency is improved.

Specifically, the cooling path in the housing HS has a portion of the cooling path CP1 that cools the motor 2 and a portion of the cooling path CP3 that cools the ring gear 42. By providing the cooling path CP3, the contact area between the housing HS and the cooling water W is increased compared with that in a case in which the housing HS includes only the cooling path CP1. Accordingly, the cooling efficiency of the unit 1 is improved by heat exchange between the unit 1 that generates heat and the cooling water W. That is, it can be said that the heat exchange efficiency in the unit 1 is improved.

Further, by providing the cooling path CP3 through which the cooling water W flows so as to surround the outer periphery of the ring gear 42, the meshing noise N generated at the meshing portion between the fixed ring gear 42 and the small-diameter gear portion 432 can be reduced by the cooling water W.

Specifically, the meshing noise N between the ring gear 42 and the small-diameter gear portion 432 is propagated to an outside of the housing HS. Therefore, by providing the cooling path CP3 on an outer peripheral side of the ring gear 42, the cooling water W flowing through the cooling path CP3 functions as a shielding object that shields the meshing noise N that propagates in the radial direction of the rotation axis X, of the meshing noise N. Accordingly, the meshing noise N can be reduced from reaching the vehicle room VR.

(2) When viewed in the radial direction of the rotation axis X, the housing HS has a protrusion 141b1 (protrusion portion) in a region that overlaps the ring gear 42.

The protrusion 141b1 protrudes toward an inside of the cooling path CP3.

The protrusion 141b1 is provided over the entire circumference of the connection wall portion 141b along the circumferential direction around the rotation axis X.

The protrusion 141b1 is provided in a spiral shape whose position in the rotation axis X direction varies from the tubular wall portion 141a toward the inclined portion 141c.

The centrifugal force due to the revolution of the small-diameter gear portion 432 acts on the connection wall portion 141b of the gear case 14. Due to the centrifugal force, stress spreading outward in the radial direction of the rotation axis X is generated in the connection wall portion 141b. Therefore, with the configuration as described above, by providing the spiral protrusion 141b1 on the outer periphery of the connection wall portion 141b, the protrusion 141b1 functions as a rib. Accordingly, the rigidity of the gear case 14 with respect to the stress spreading outward in the radial direction of the rotation axis X can be increased. Accordingly, the rigidity of the gear case 14 can be increased and the deformation can be reduced. Further, the vibration of the gear case 14 due to the excitation force generated in the ring gear 42 as the gears (the small-diameter gear portion 432 and the ring gear 42) mesh with each other can be reduced, and the generation of noise due to the vibration of the gear case 14 can be reduced.

Here, instead of the protrusion 141b1 protruding from the connection wall portion 141b, it is also conceivable to spirally provide a protrusion protruding from an inner peripheral surface of the peripheral wall portion 181 of the cover member 18 to form the cooling path CP3. However, when the protrusion is provided on the cover member 18, the protrusion is separated from the gear case 14, so that the function as a rib is not exerted, and the rigidity of the gear case 14 is not increased. Therefore, it is preferable to provide the protrusion 141b1 on the connection wall portion 141b.

Further, by providing the protrusion 141b1, a volume of a region of the connection wall portion 141b that supports the ring gear 42 can be increased (thickness increased). Accordingly, the effect of shielding the propagation of the meshing noise N is also increased, which can contribute to measures against noise.

Further, since the protrusion 141b1 constitutes a part of the cooling path CP3, a contact area between the cooling water W in the cooling path CP3 and the gear case 14 can be increased. Accordingly, the heat exchange efficiency is improved.

Further, since the protrusion 141b1 constitutes a part of the cooling path CP3, a space in the cooling path CP3 can be effectively used. The cooling path CP3 can be locally provided only around the ring gear 42 in the gear case 14 while ensuring the contact area between the cooling water W and the gear case 14. This contributes to a reduction in dimension of the unit 1 in the rotation axis X direction.

In the present embodiment, an aspect in which the protrusion 141b1 has a height H3 at which a distal end of the protrusion 141b1 comes into contact with the inner periphery of the peripheral wall portion 181 has been described, and the present invention is not limited to this aspect. The protrusion 141b1 may have such a height that a slight gap is formed between the distal end of the protrusion 141b1 and the inner peripheral surface of the peripheral wall portion 181.

(3) When viewed in the radial direction of the rotation axis X, the spiral portion of the protrusion 141b1 overlaps the ring gear 42 in the radial direction of the rotation axis X.

With this configuration, by forming the protrusion 141b1 in a spiral shape, the cooling water W in the cooling path CP3 can smoothly flow. Further, by providing the protrusion 141b1 at a position that overlaps the ring gear 42, a volume of the connection wall portion 141b around the ring gear 42 can be increased.

Accordingly, the effect of shielding the meshing noise N by the connection wall portion 141b is improved, which can contribute to measures against noise.

(4) The housing HS includes the gear case 14 that surrounds an outer periphery of the planetary reduction gear 4.

The gear case 14 includes the tubular wall portion 141a and the connection wall portion 141b having an outer diameter smaller than that of the tubular wall portion 141a.

The tubular wall portion 141a is a region that surrounds the large-diameter gear portion 431 (large pinion gear) of the stepped pinion gear 43 (stepped pinion gear) of the planetary reduction gear 4.

The connection wall portion 141b is connected to the tubular wall portion 141a, and is a region in which the ring gear 42 of the planetary reduction gear 4 is fixed to the inner periphery thereof.

A boundary between the tubular wall portion 141a and the connection wall portion 141b in the rotation axis X direction is the stepped surface 16.

When viewed in the axial direction, the cooling path CP3 has a portion that overlaps the stepped surface 16 and the large-diameter gear portion 431 of the stepped pinion gear 43.

With this configuration, the cooling path CP3 can be provided using the stepped surface 16 between the tubular wall portion 14la and the connection wall portion 141b, which contributes to a reduction in the dimension of the unit 1 in the radial direction of the rotation axis X.

(5, 6) The housing HS includes the gear case 14 (flow path-equipped case) having the cooling path CP3, and the motor case 10 (facing case) that faces the gear case 14 in the rotation axis X direction.

When viewed in the radial direction of the rotation axis X, the cooling path CP3 extends in a direction away from a mating surface T between the gear case 14 and the motor case 10.

A cooling path of the housing HS includes the cooling path CP3 and the cooling path CP2.

With this configuration, since the cooling path is provided not only in the motor case 10 but also in the gear case 14, the contact area between the cooling water W and the housing HS can be increased, and the heat exchange efficiency can be increased.

Further, since the cooling path CP3 extends from a position away from the mating surface T in a direction away from the mating surface T, leakage of the cooling water W from a vicinity of the mating surface T can be reduced.

(Modification 1)

In the unit 1 according to the embodiment described above, the cooling path CP3 is provided in the connection wall portion 141b which is a region in the gear case 14 substantially parallel to the rotation axis X. The disposition of the cooling path is not limited to this aspect.

For example, a unit 1A may have the cooling path CP3 provided in a range from the connection wall portion 141b which is a region substantially parallel to the rotation axis X to the inclined portion 141c which is a region inclined with respect to the rotation axis X. In the following Modification 1, only portions different from the embodiment described above will be described in principle.

Figure 13:
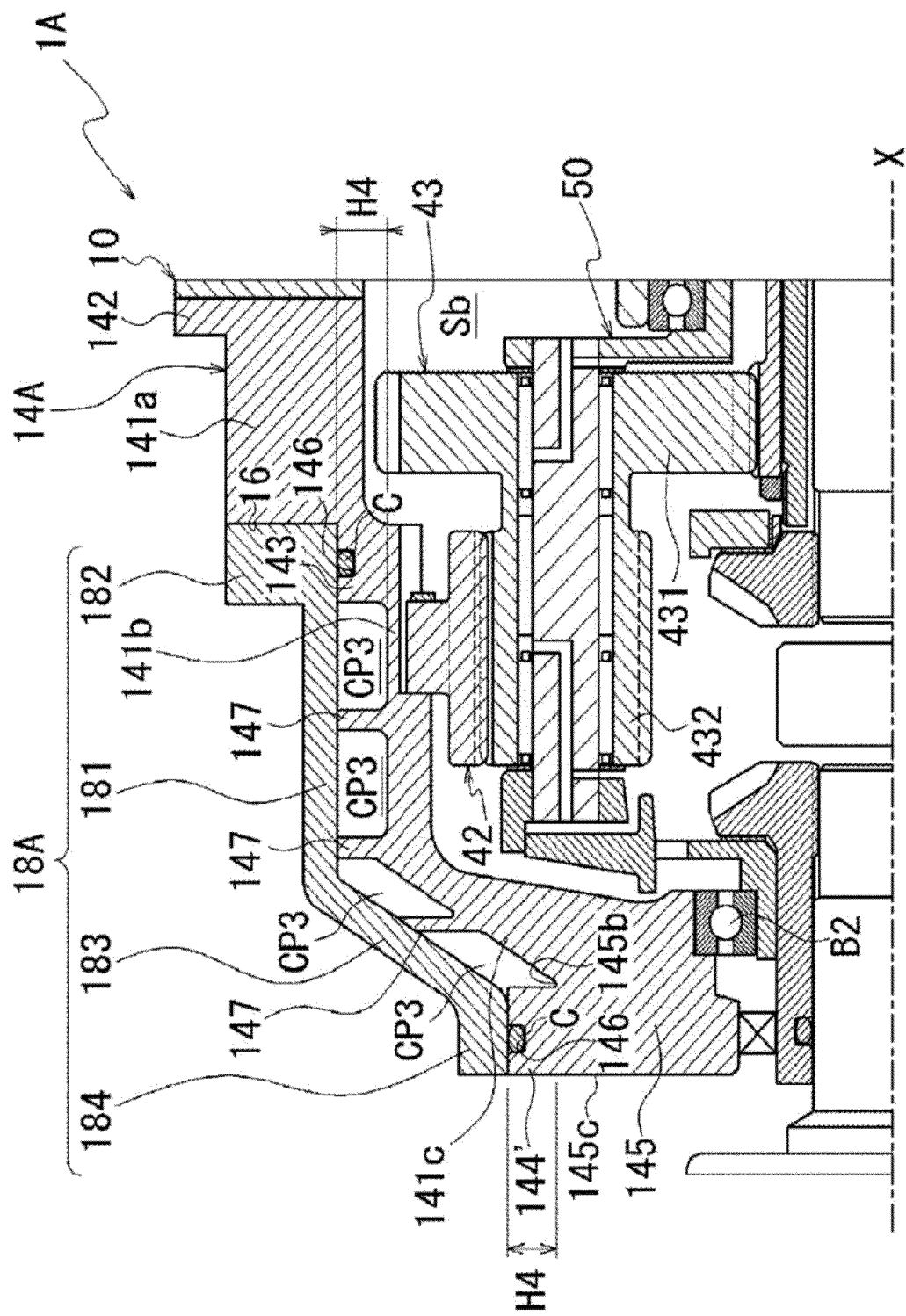
FIG. 13 is a diagram illustrating Modification 1.

FIG. 13 is a diagram illustrating the unit 1A according to Modification 1.

As illustrated in FIG. 13, a peripheral wall portion 141 of a gear case 14A is a region between the joint portion 142 and the support portion 145 in the rotation axis X direction.

The peripheral wall portion 141 includes the tubular wall portion 141a, the connection wall portion 141b, and the inclined portion 141c in this order from the joint portion 142 (right side in the drawing).

A region of the connection wall portion 141b closer to the tubular wall portion 141a is the thick portion 143 having a large radial thickness. The seal groove 146 onto which the seal member C is fitted is provided on the outer periphery of the thick portion 143.

The seal groove 146 onto which the seal member C is fitted is also provided in a thick portion 144' closer to the support portion 145. The thick portions 144' is a portion that protrudes radially outward from a radial outer periphery 145b of the support portion 145. In the support portion 145, the thick portion 144' is provided flush with an end surface 145c in the rotation axis X direction. The thick portion 144' is provided over the entire circumference in the circumferential direction around the rotation axis X.

In the peripheral wall portion 141, a protrusion 147 is provided on an outer periphery of a range from the connection wall portion 141b to the inclined portion 141c.

The protrusion 147 is a wall that continues in the circumferential direction around the rotation axis X. The protrusion 147 is provided with a phase shift in the circumferential direction around the rotation axis X, and is provided in a spiral shape whose position in the rotation axis X direction varies from the thick portion 143 toward the thick portion 144'.

A radial thickness (protrusion height) of the protrusion 147 in the radial direction of the rotation axis X is the same as the radial thickness H4 of the thick portions 143 and 144'.

In the gear case 14A, a range from the thick portion 143 of the peripheral wall portion 141 to the thick portions 144' of the support portion 145 is a region onto which the cover member 18A is fitted and assembled.

A space between the thick portion 143 and the protrusion 147, a space between the protrusions 147 and 147 adjacent to each other in the rotation axis X direction, and a space between the protrusion 147 and the thick portion 144' are spaces for forming the cooling path CP3 between the cover member 18A, which will be described later.

The cover member 18A includes a tubular peripheral wall portion 181, a joint portion 182, a tubular inclined portion 183, and a tubular wall portion 184.

The peripheral wall portion 181 is formed with an inner diameter that matches an outer diameter of the thick portion 143 of the gear case 14. The joint portion 182 is connected to an end portion of the peripheral wall portion 181 closer to the motor case 10. The joint portion 182 is formed with an outer diameter that joins the outer diameter of the tubular wall portion 141a of the gear case 14.

The inclined portion 183 is connected to an end portion of the peripheral wall portion 181 opposite to the joint portion 182. The inclined portion 183 is inclined in a direction in which an inner diameter thereof decreases with increasing distance from the peripheral wall portion 181 in the rotation axis X direction.

The inclined portion 183 has a shape that matches an outer shape of the inclined portion 141c of the gear case 14A.

The tubular wall portion 184 is connected to an end portion of the inclined portion 183 opposite to the peripheral wall portion 181. The tubular wall portion 184 is provided in a direction along the rotation axis X, and is formed with an inner diameter that allows the tubular wall portion 184 to be fitted onto the support portion 145 of the bearing B2.

The cover member 18A is fitted onto the gear case 14A from the rotation axis X direction, and is positioned at a position where the joint portion 182 of the cover member 18A is brought into contact with the stepped surface 16 of the gear case 14A.

In this state, the contact portion 182 and the tubular wall portion 184 of the cover member 18A are respectively fitted onto outer peripheries of the thick portion 143 and the thick portions 144' of the gear case 14A.

The protrusion 147 in the gear case 14A comes into contact with the inner peripheries of the peripheral wall portion 181 and the inclined portion 183 of the cover member 18A, and the cooling path CP3 is formed between the cover member 18A and the gear case 14A.

The cooling path CP3 is spirally formed in a range from the peripheral wall portion 181 to the inclined portion 183.

Here, the seal member C provided on the thick portion 143 comes into contact with the inner periphery of the contact portion 182 to seal a gap between the outer periphery of the thick portion 143 and the inner periphery of the contact portion 182.

The seal member C provided on the thick portions 144' comes into contact with the inner periphery of the tubular wall portion 184 to seal a gap between the outer periphery of the thick portions 144' and the inner periphery of the tubular wall portion 184.

Accordingly, leakage of the cooling water W flowing through the cooling path CP3 is prevented.

As described above, in the unit 1A, the cooling paths (CP1, CP3) are continuously formed in a range from the motor case 10 to the gear case 14A. In particular, the cooling path CP3 is provided to reach the inclined portion 141c of the gear case 14A.

Therefore, compared to a case in which the cooling path is provided only on the motor case 10 or a case in which the cooling path is provided only on the connection wall portion 141b of the gear case 14A, an entire length of the cooling path is increased, and thus a contact area between the cooling water W and the gear case 14A can be increased.

Accordingly, cooling efficiency of the unit 1A by heat exchange between the unit 1A that generates heat and the cooling water W is improved. That is, it can be said that heat exchange efficiency in the unit 1A is improved.

Further, when viewed in the radial direction of the rotation axis X, an overlapping range of the gear case 14 and the cooling path CP3 is larger than that of the unit 1.

Further, as the contact area between the cooling water W and the gear case 14A increases, the cooling water W flowing through the cooling path CP3 has an increased effect of shielding the meshing noise N that propagates in the radial direction of the rotation axis X.

Accordingly, the effect of shielding the meshing noise N by the cooling water W is also increased.

(Modification 2)

In the embodiment described above, an aspect in which the ring gear 42 is cooled by the cooling path CP3 provided separately from the cooling path CP1 has been described, and the present invention is not limited to this aspect. For example, a unit 1B may be configured such that the cooling path CP1 is extended toward a gear case 14B and the ring gear 42 is also cooled by the cooling path CP1. In the following Modification 2, only portions different from the present embodiment will be described.

Figure 14:
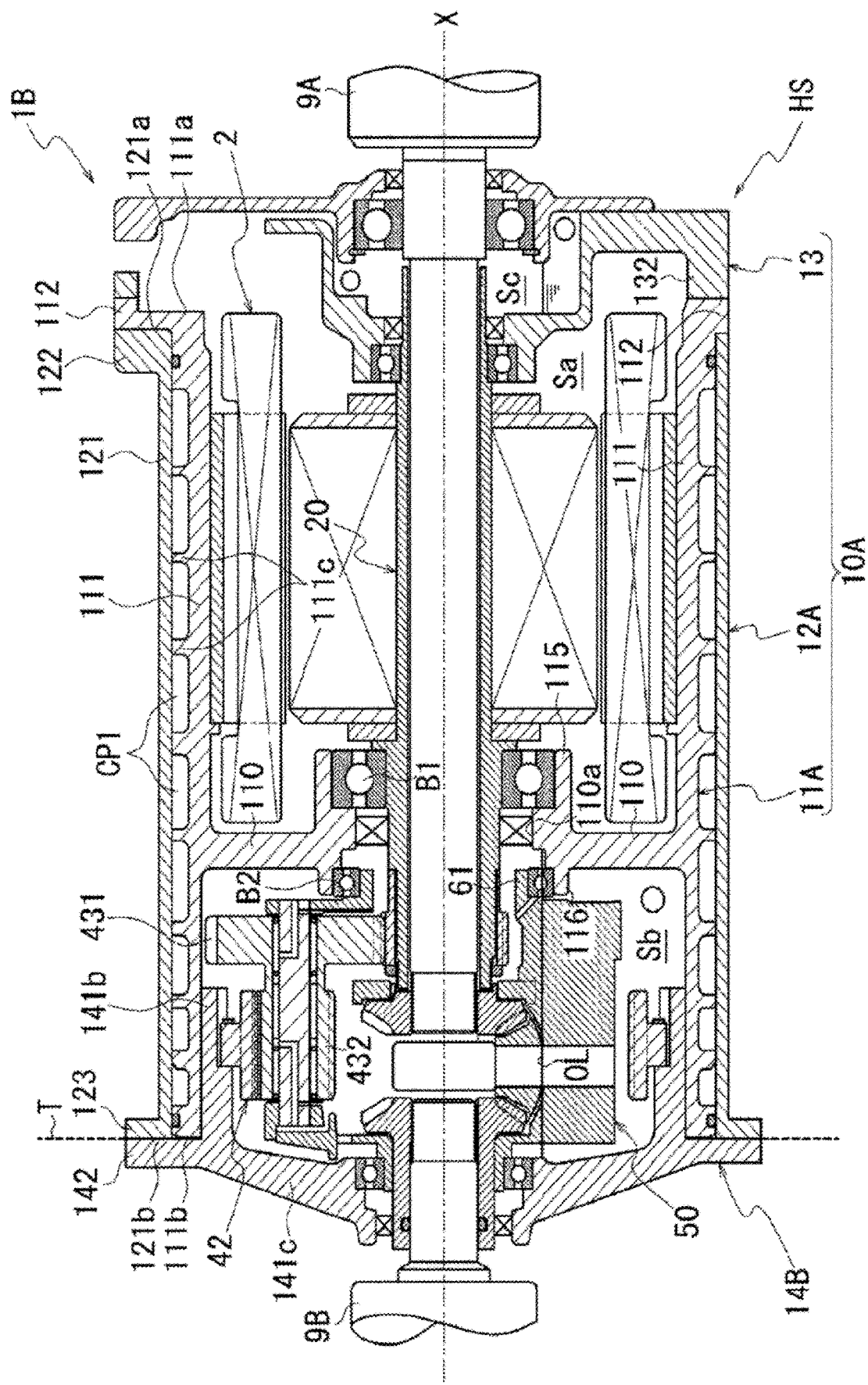
FIG. 14 is a diagram illustrating Modification 2.

FIG. 14 is a diagram illustrating the unit 1B according to Modification 2.

As illustrated in FIG. 14, the motor case 10A that constitutes the unit 1B includes a first case member 11A, a second case member 12A fitted onto the first case member 11A, and the cover member 13 joined to one end of the first case member 11A.

The second case member 12A includes a cylindrical peripheral wall portion 121, a flange-shaped joint portion 122 provided at one end 121a of the peripheral wall portion 121, and a flange-shaped joint portion 123 provided at the other end 121b of the peripheral wall portion 121.

The peripheral wall portion 121 of the second case member 12A is formed with an inner diameter that allows the peripheral wall portion 121 to be fitted onto the support wall portion 111 of the first case member 11A.

The first case member 11A and the second case member 12A are assembled to each other by fitting the peripheral wall portion 121 of the second case member 12A onto the support wall portion 111 of the first case member 11A.

A wall portion 110 (cover) extending radially inward is provided in a region between the one end 111a and the other end 111b of the support wall portion 111. The wall portion 110 is provided in a direction orthogonal to the rotation axis X. An opening 110a through which the drive shaft 9A is inserted is provided in a region of the wall portion 110 that intersects the rotation axis X.

A motor support portion 115 is provided on a surface of the wall portion 110 closer to the motor 2 (right side in the drawing). The motor support portion 115 has a tubular shape surrounding the opening 110a and extends toward the motor 2 along the rotation axis X. A bearing B1 is supported on an inner periphery of the motor support portion 115. The outer periphery of the motor shaft 20 is supported by the motor support portion 115 via the bearing B1.

A tubular wall portion 116 is provided on a surface of the wall portion 110 closer to the differential case 50 (left side in the drawing). The tubular wall portion 116 has a tubular shape surrounding the opening 110a and extends toward the differential case 50 along the rotation axis X. A bearing B2 is supported on an inner periphery of the tubular wall portion 116. The bearing B2 supports an outer periphery of the tubular wall portion 61 of the differential case 50.

The protrusion 111c is provided on the outer periphery of the support wall portion 111 of the first case member 11A.

The protrusion 111c is provided with a phase shift in the circumferential direction around the rotation axis X, and is provided in a spiral shape whose position in the rotation axis X direction varies from the one end 111a toward the other end 111b of the support wall portion 111.

As illustrated in FIG. 14, the peripheral wall portion 121 of the second case member 12A is fitted onto the support wall portion 111 of the first case member 11A. Accordingly, a spiral space, which continues from the one end 111a of the support wall portion 111 toward the other end 111b, is formed between the peripheral wall portion 121 and the support wall portion 111. The spiral space forms the cooling path CP1 through which the cooling water W flows.

A joint portion 142 of the gear case 14B comes into contact with the joint portion 123 at the other end 121b of the peripheral wall portion 121 from the rotation axis X direction. The gear case 14B and the second case member 12A are connected to each other by bolts (not illustrated). A mating surface T between the joint portion 142 of the gear case 14B and the joint portion 123 of the second case member 12A is orthogonal to the rotation axis X.

A space formed inside the joined motor case 10A and gear case 14B is divided into two spaces by the wall portion 110 (cover) of the first case member 11A. Specifically, a space surrounded by the support wall portion 111, the wall portion 110, and the cover member 13 is a motor chamber Sa. A space surrounded by the support wall portion 111, the wall portion 110, and the gear case 14B is a gear chamber Sb.

Here, the joint portion 142 of the gear case 14B is provided at a boundary portion between the connection wall portion 141b and the inclined portion 141c in the rotation axis X direction. The joint portion 142 protrudes outward from the connection wall portion 141b in the radial direction of the rotation axis X. The connection wall portion 141b has an outer diameter that substantially matches an inner diameter of the support wall portion 111 of the first case member 11A.

When the joint portion 123 of the second case member 12A and the joint portion 142 of the gear case 14B are joined to each other in the rotation axis X direction, the connection wall portion 141b is inserted into the support wall portion 111 of the first case member 11A. The ring gear 42 supported by the connection wall portion 141b is disposed inside the support wall portion 111.

The cooling path CP1 is formed in a range from the motor 2 to the ring gear 42 in the rotation axis X direction. The ring gear 42 overlaps the cooling path CP1 in the radial direction of the rotation axis X.

When viewed in the radial direction of the rotation axis X, the cooling path CP1 extends in a direction away from the mating surface T toward the motor 2 along the rotation axis X.

Therefore, the cooling path CP1 can cool the motor 2 and the ring gear 42. Therefore, the cover member 18 and the pipe P2 (see FIG. 8) can be omitted, so that the number of components can be reduced.

The cooling path CP1 also overlaps the large-diameter gear portion 431 in the radial direction of the rotation axis X. The oil OL in the gear chamber Sb is largely scraped up by the large-diameter gear portion 431 revolving in the circumferential direction around the rotation axis X. Therefore, a movement distance of the oil OL in the circumferential direction around the rotation axis X is longest when the oil OL is scraped up by the large-diameter gear portion 431. Accordingly, since a distance over which the heat exchange is performed between the cooling water W in the cooling path CP1 and the oil OL is also increased, heat exchange efficiency of the entire unit 1B is improved.

(Modification 3)

In the embodiment described above, an aspect in which one planetary reduction gear 4 is provided on the transmission path of the output rotation of the motor 2 has been described, and the present invention is not limited to this aspect. For example, as illustrated in FIG. 15, a unit 1C may include two planetary reduction gears (a first planetary reduction gear 4A and a second planetary reduction gear 4B) on the transmission path of the output rotation of the motor 2.

Figure 15:
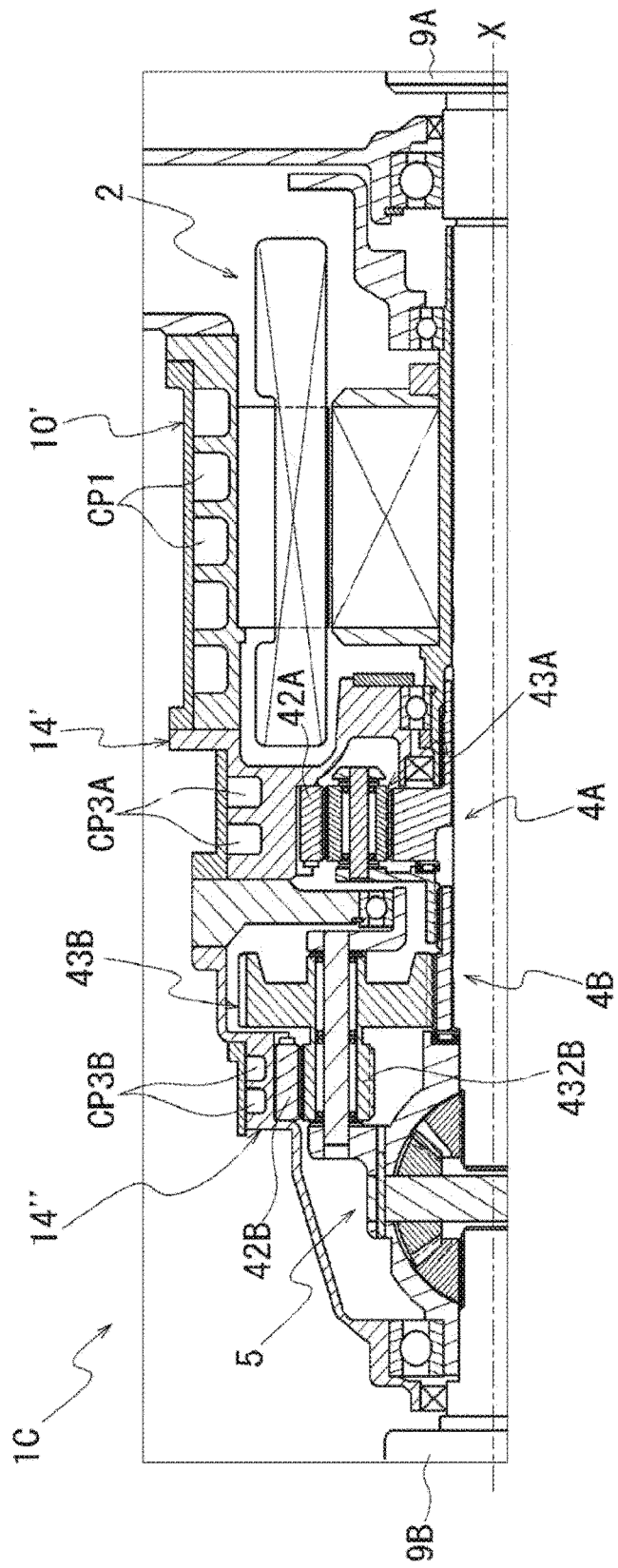
FIG. 15 is a diagram illustrating Modification 3.

FIG. 15 is a diagram illustrating the unit 1C according to Modification 3. In FIG. 15, the seal groove and the seal member are omitted.

As illustrated in FIG. 15, the first planetary reduction gear 4A is connected downstream of the motor 2. The second planetary reduction gear 4B is connected downstream of the first planetary reduction gear 4A. The differential mechanism 5 is connected downstream of the second planetary reduction gear 4B.

The unit 1C includes a motor case 10' that accommodates the motor 2, a first gear case 14' that accommodates the first planetary reduction gear 4A, and a second gear case 14' that accommodates the second planetary reduction gear 4B.

The first planetary reduction gear 4A includes a pinion gear 43A. The pinion gear 43A of the first planetary reduction gear 4A meshes with a ring gear 42A. The ring gear 42A is fixed to the first gear case 14'.

The second planetary reduction gear 4B includes a stepped pinion gear 43B. A small-diameter gear portion 432B of the stepped pinion gear 43B meshes with a ring gear 42B. The ring gear 42B is fixed to the second gear case 14''.

In the unit 1C, the motor case 10' includes a cooling path CP1 surrounding the motor 2. The first gear case 14' and the second gear case 14'' includes cooling paths CP3A and CP3B surrounding the ring gears 42A and 42B, respectively. The cooling path CP3A is connected to the cooling path CP1 by a pipe (not illustrated). The cooling path CP3B is connected to the cooling path CP3A by a pipe (not illustrated). The cooling path CP3B is also connected to the oil cooler 83 (see FIG. 7) through a pipe (not illustrated). The cooling water W that has passed through the cooling path CP1 sequentially flows through the cooling paths CP3A and CP3B, and then is discharged to the oil cooler 83.

Accordingly, peripheries of the two ring gears 42A and 42B can be cooled by the cooling water W flowing through the cooling paths CP3A and CP3B. Further, a meshing noise generated by meshing between the ring gear 42A and the pinion gear 43A and meshing noise generated by meshing between the ring gear 42B and the small-diameter gear portion 432B can be shielded.

In the unit 1C according to Modification 3, an aspect in which the cooling paths CP3A and CP3B are provided with respect to the two ring gears 42A and 42B, respectively has been described, and the present invention is not limited to this aspect. A cooling path may be provided around at least one of the ring gears. This is because heat exchange efficiency of the unit 1C can be improved and an effect of shielding the meshing noise can be increased as compared with a case in which the cooling path is not provided around the ring gear.

(Other Modifications)

In the embodiment described above, an aspect in which the planetary reduction gear 4 includes the stepped pinion gear 43 (stepped pinion gear) has been described, and the present invention is not limited to this aspect. For example, the planetary reduction gear 4 may be a pinion gear formed of a non-stepped gear. In this case, the pinion gear meshes with the sun gear 41 on the radially inner side and meshes with the ring gear 42 on the radially outer side.

Therefore, the periphery of the ring gear 42 can be cooled by the cooling water W flowing through the cooling path CP3.

In the embodiment described above, a case in which the inlet CP3$a$ and the outlet CP3$b$ of the cooling path CP3 are provided above the rotation axis X (horizontal line HL) of the motor 2 in the vertical line VL direction in a state in which the unit 1 is mounted on the vehicle V (see FIG. 8 and FIG. 9) has been described. The present invention is not limited to this aspect.

For example, the inlet CP3$a$ of the cooling path CP3 may be provided above the rotation axis X (horizontal line HL) of the motor 2 in the vertical line VL direction, and the outlet CP3$b$ may be provided below the rotation axis X (horizontal line HL) of the motor 2 in the vertical line VL direction. Accordingly, the cooling water W can smoothly flow using gravity.

In the embodiment described above, an aspect in which the protrusion 141$b$1 has a spiral shape has been described, and the present invention is not limited to this aspect. For example, the protrusion 141$b$1 may be a linear continuous wall extending in the rotation axis X direction, and a plurality of the protrusions 141$b$1 may be provided at intervals in the circumferential direction around the rotation axis X. Accordingly, a linear cooling path CP3 along the rotation axis X direction is formed. Further, the protrusion 141$b$1 may be formed in a linear shape by arranging a plurality of dot-like protrusions instead of the continuous wall. This is because the cooling water W is guided in a direction in which the protrusions are arranged. Further, the protrusion 141$b$1 may be a planar continuous wall having a width in the rotation axis X direction and the circumferential direction around the rotation axis X. This is because the cooling water W is guided so as to flow through a position avoiding the planar continuous wall.

In the embodiment described above, an aspect in which the ring gear 42 is separate from the gear case 14 has been described, and the present invention is not limited to this aspect. For example, the ring gear 42 may be formed integrally with the gear case 14.

In the embodiment described above, an aspect in which the unit 1 is connected to the front wheels of the vehicle V has been described, and the present invention is not limited to this aspect (see FIG. 3). The unit 1 may be connected to rear wheels of the vehicle V. Further, the unit 1 may be connected to each of the front wheels and the rear wheels of the vehicle V.

In an aspect of the present invention, the housing HS that accommodates at least the power transmission mechanism 3 is taken as an example. In another aspect of the present invention, the housing HS that accommodates at least the motor 2 may be used. In this case, the power transmission mechanism 3 may or may not be accommodated in the same housing HS.

In another aspect of the present invention, the housing HS that accommodates at least the inverter IV may be used. In this case, the power transmission mechanism 3 may or may not be accommodated in the same housing HS.

In another aspect of the present invention, the housing HS that accommodates at least a battery may be used. The battery may be, for example, a drive battery. In this case, the power transmission mechanism 3 may or may not be accommodated in the same housing HS.

In an aspect of the present invention, the power transmission mechanism 3 includes, for example, a gear mechanism and an annular mechanism.

The gear mechanism includes, for example, a reduction gear mechanism, an acceleration gear mechanism, and a differential gear mechanism (differential mechanism).

The reduction gear mechanism and the acceleration gear mechanism include, for example, a planetary gear mechanism and a parallel gear mechanism.

The annular mechanism includes, for example, an endless annular component.

The endless annular component includes, for example, a chain sprocket, a belt, and a pulley.

The differential mechanism 5 is, for example, a bevel gear type differential gear or a planetary gear type differential gear.

The differential mechanism 5 includes a differential case as an input element, two output shafts as output elements, and a differential gear set as a differential element.

In the bevel gear type differential gear, the differential gear set includes bevel gears.

In the planetary gear type differential gear, the differential gear set includes planetary gears.

The unit 1 includes a gear that rotates integrally with the differential case.

For example, a final gear (differential ring gear) of the parallel gear mechanism rotates integrally with the differential case. For example, when a carrier of the planetary gear mechanism is connected to the differential case, a pinion gear rotates (revolves) integrally with the differential case.

For example, a reduction gear mechanism is connected downstream of the motor 2. A differential gear mechanism is connected downstream of the reduction gear mechanism. That is, a differential gear mechanism is connected downstream of the motor 2 via a reduction gear mechanism. An acceleration gear mechanism may be used instead of the reduction gear mechanism.

A single-pinion type planetary gear mechanism can use, for example, a sun gear as an input element, a ring gear as a fixed element, and a carrier as an output element.

A double-pinion type planetary gear mechanism can include, for example, a sun gear as an input element, a ring gear as an output element, and a carrier as a fixed element.

As a pinion gear of the single-pinion type planetary gear mechanism or the double-pinion type planetary gear mechanism, for example, a stepped pinion gear or a non-stepped pinion gear can be used.

The stepped pinion gear includes a large pinion and a small pinion. For example, it is preferable to mesh the large pinion with the sun gear. For example, it is preferable to fit the small pinion into the ring gear.

The non-stepped pinion gear is not a stepped pinion gear.

In the present embodiment, the unit mounted on the vehicle has been described as an example, the present invention is not limited to this aspect. The unit can be applied to other than the vehicle.

The embodiment of the present invention has been described above, and the above embodiment is merely an application example of the present invention and is not intended to limit the technical scope of the present invention to the specific configuration of the above embodiment. The embodiments can be changed as appropriate within the scope of the technical idea of the invention.

DESCRIPTION OF REFERENCE SIGNS 1, 1A to 1C unit
10, 10A motor case (facing case)
14, 14A gear case (flow path-equipped case)
141$b$1 protrusion (protrusion portion)
147 protrusion (protrusion portion)
4 planetary reduction gear (planetary gear mechanism)
42 ring gear
43 stepped pinion gear
431 large-diameter gear portion (large pinion)
CP3 cooling path (flow path)
HS housing
T mating surface
W cooling water (coolant)
X rotation axis

The invention claimed is:

1. A unit comprising: a housing configured to accommodate an oil and a planetary gear mechanism, the housing being provided below a vehicle room in a vertical line direction, wherein
the housing includes a flow path through which a coolant made of a material different from the oil flows,
the planetary gear mechanism includes a ring gear fixed to the housing,
a protrusion portion is provided on an outer peripheral side of a portion that supports the ring gear,
the protrusion portion protrudes outward in a radial direction from the outer peripheral side toward an inside of the flow path,
the protrusion portion is provided in a spiral shape whose position in an axial direction varies,
the flow path has a flow path portion sandwiched between the vehicle room and the ring gear when viewed in the radial direction, and
the protrusion portion has a portion that overlaps the ring gear when viewed in the radial direction.

2. The unit according to claim 1, wherein
a spiral portion of the protrusion portion overlaps the ring gear when viewed in the radial direction.

3. The unit according to claim 1, wherein
the flow path overlaps a large pinion gear of a stepped pinion gear of the planetary gear mechanism when viewed in the axial direction.

4. The unit according to claim 1, wherein
the housing includes a flow path-equipped case including the flow path and a facing case that faces the flow path-equipped case, and
the flow path extends in a direction away from a mating surface of the flow path-equipped case and the facing case when viewed in the radial direction.

5. The unit according to claim 3, wherein
the housing includes a flow path-equipped case including the flow path and a facing case that faces the flow path-equipped case, and
the flow path extends in a direction away from a mating surface of the flow path-equipped case and the facing case when viewed in the radial direction.

6. The unit according to claim 1, wherein
the flow path includes a portion through which the coolant flows downward from above.

7. A unit comprising: a housing configured to accommodate an oil and a planetary gear mechanism, wherein
the housing includes a flow path through which a coolant made of a material different from the oil flows,
the planetary gear mechanism includes a ring gear fixed to the housing,
the planetary gear mechanism includes a stepped pinion gear including a large pinion gear and a small pinion gear that has a smaller diameter than the large pinion gear,
the ring gear meshes with the small pinion gear,
the flow path has a portion that overlaps the ring gear when viewed in a radial direction, and
the flow path overlaps the large pinion gear when viewed in an axial direction.

8. The unit according to claim 7, wherein
the housing includes a protrusion portion that overlaps the ring gear when viewed in the radial direction, and
the protrusion portion protrudes toward the flow path.

9. The unit according to claim 8, wherein
a spiral portion of the protrusion portion overlaps the ring gear when viewed in the radial direction.

10. The unit according to claim 7, wherein
the housing includes a flow path-equipped case including the flow path and a facing case that faces the flow path-equipped case, and
the flow path extends in a direction away from a mating surface of the flow path-equipped case and the facing case when viewed in the radial direction.

11. The unit according to claim 7, wherein
the flow path includes a portion through which the coolant flows downward from above.

12. The unit according to claim 1, wherein
the housing includes a flow path-equipped case including the flow path and a facing case that faces the flow path-equipped case, and the coolant flows in a direction away from a mating surface of the flow path-equipped case and the facing case when viewed in the radial direction.

13. A unit comprising: a housing configured to accommodate an oil and a planetary gear mechanism, wherein
the housing includes a flow path through which a coolant made of a material different from the oil flows,
the planetary gear mechanism includes a ring gear fixed to the housing,
the flow path has a portion that overlaps the ring gear when viewed in a radial direction,
the housing includes a protrusion portion that overlaps the ring gear when viewed in the radial direction,
the protrusion portion is provided on an outer peripheral side of a connection wall portion that supports the ring gear,
the protrusion portion extends outward in the radial direction from the outer peripheral side,
the housing includes a flow path-equipped case including the flow path and a facing case that faces the flow path-equipped case, and
the flow path extends in a direction away from a mating surface of the flow path-equipped case and the facing case when viewed in the radial direction.

14. The unit according to claim 13, wherein
a spiral portion of the protrusion portion overlaps the ring gear when viewed in the radial direction.

15. The unit according to claim 13, wherein
the flow path overlaps a large pinion gear of a stepped pinion gear of the planetary gear mechanism when viewed in an axial direction.

16. The unit according to claim 13, wherein
the flow path includes a portion through which the coolant flows downward from above.

\* \* \* \* \*